(12) United States Patent
Simone et al.

(10) Patent No.: US 10,258,837 B2
(45) Date of Patent: *Apr. 16, 2019

(54) METHOD OF FORMING GOLF CLUB HEAD ASSEMBLY

(71) Applicant: KARSTEN MANUFACTURING CORPORATION, Phoenix, AZ (US)

(72) Inventors: Matthew W. Simone, Phoenix, AZ (US); Evan R. Greer, Phoenix, AZ (US); Ryan M. Stokke, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/829,635

(22) Filed: Dec. 1, 2017

(65) Prior Publication Data
US 2018/0093142 A1   Apr. 5, 2018

Related U.S. Application Data

(63) Continuation-in-part of application No. 15/046,132, filed on Feb. 17, 2016, now Pat. No. 9,938,601, which
(Continued)

(51) Int. Cl.
| | |
|---|---|
| A63B 53/04 | (2015.01) |
| B23K 10/02 | (2006.01) |
| C22C 14/00 | (2006.01) |
| C22F 1/18 | (2006.01) |
| B23K 103/14 | (2006.01) |

(52) U.S. Cl.
CPC .......... *A63B 53/04* (2013.01); *A63B 53/0466* (2013.01); *A63B 53/0475* (2013.01); *B23K 10/02* (2013.01); *C22C 14/00* (2013.01); *C22F 1/183* (2013.01); *A63B 53/047* (2013.01); *A63B 2053/042* (2013.01); *A63B 2053/0416* (2013.01); *A63B 2053/0425* (2013.01);
(Continued)

(58) Field of Classification Search
CPC ... C22F 1/183; A63B 53/04; A63B 2053/042; A63B 2053/0416; A63B 2053/0425; A63B 2209/00; C22C 14/00; B23K 10/02; B23K 2203/14
USPC ................ 473/342, 345, 348, 349, 329, 409
See application file for complete search history.

(56) References Cited

U.S. PATENT DOCUMENTS

| 4,923,532 A | 5/1990 | Zedalis et al. |
| 6,333,484 B1 | 12/2001 | Foster et al. |

(Continued)

FOREIGN PATENT DOCUMENTS

JP   2004010963 A   1/2004

OTHER PUBLICATIONS

PCT International Search Report and Written Opinion dated May 20, 2015 from corresponding PCT Application No. PCT/US2015/016207 filed Feb. 17, 2015.

*Primary Examiner* — Benjamin Layno

(57) ABSTRACT

A method of forming a golf club head assembly includes aligning a faceplate with a recess of a club head; welding the faceplate to the club head; then, after welding the faceplate, heating the club head and the faceplate to at least a solvus temperature of the faceplate for a predetermined amount of time; and then, after heating the club head and the faceplate, allowing the club head and the faceplate to air cool.

20 Claims, 20 Drawing Sheets

Related U.S. Application Data is a continuation-in-part of application No. 14/624,488, filed on Feb. 17, 2015, now Pat. No. 9,238,858, which is a continuation-in-part of application No. 14/228,503, filed on Mar. 28, 2014, now Pat. No. 9,452,488.

(60) Provisional application No. 61/941,117, filed on Feb. 18, 2014, provisional application No. 62/428,728, filed on Dec. 1, 2016.

(52) U.S. Cl.
CPC ............... *A63B 2053/0429* (2013.01); *A63B 2053/0462* (2013.01); *A63B 2209/00* (2013.01); *B23K 2103/14* (2018.08)

(56) References Cited

U.S. PATENT DOCUMENTS

| | | |
|---|---|---|
| 6,955,612 B2 | 10/2005 | Lu |
| 7,357,731 B2 | 4/2008 | Johnson et al. |
| 7,553,384 B2 | 6/2009 | Groh |
| 9,155,942 B2 | 10/2015 | Ueda |
| 9,938,601 B2 * | 4/2018 | Simone .............. A63B 53/0466 |
| 2002/0016216 A1 | 2/2002 | Kobayashi et al. |
| 2003/0008726 A1 | 1/2003 | Sano |
| 2003/0064825 A1 | 4/2003 | Sano |
| 2004/0079453 A1 | 4/2004 | Groh et al. |
| 2004/0082405 A1 | 4/2004 | Sano |
| 2004/0099714 A1 | 5/2004 | Strusinski et al. |
| 2004/0147343 A1 * | 7/2004 | Billings ............. A63B 53/0466 473/349 |
| 2006/0062685 A1 | 3/2006 | Takahashi |
| 2007/0056938 A1 | 3/2007 | Chen |
| 2008/0194356 A1 | 8/2008 | Lo |
| 2009/0181794 A1 * | 7/2009 | Tsai ...................... A63B 53/04 473/349 |
| 2010/0154196 A1 * | 6/2010 | Hirano ............... A63B 53/0466 29/527.1 |
| 2010/0178996 A1 | 7/2010 | Chao |
| 2010/0205805 A1 | 8/2010 | Mega et al. |
| 2010/0317460 A1 | 12/2010 | Hirano |
| 2012/0090738 A1 | 4/2012 | Hales et al. |
| 2014/0283364 A1 | 9/2014 | Chiang et al. |

\* cited by examiner

METHOD OF FORMING GOLF CLUB HEAD ASSEMBLY

CROSS-REFERENCE TO RELATED APPLICATIONS

This is a continuation-in-part of U.S. patent application Ser. No. 15/046,132, filed on Feb. 17, 2016, now U.S. Pat. No. 9,938,601, which is a continuation-in-part of U.S. patent application Ser. No. 14/624,488, filed on Feb. 17, 2015 (now U.S. Pat. No. 9,238,858, issued Jan. 19, 2016), which is a continuation-in-part of U.S. patent application Ser. No. 14/228,503, filed on Mar. 28, 2014 (now U.S. Pat. No. 9,452,488, issued Sep. 27, 2016), which claims the benefit of U.S. Provisional Patent Application No. 61/941,117, filed on Feb. 18, 2014, the entire contents of which are fully incorporated herein by reference. This further claims priority to U.S. Provisional Patent Application No. 62/428,728, filed Dec. 1, 2016.

BACKGROUND

The present invention relates to golf clubs and particularly to a method of forming a golf club head assembly.

Conventional golf club head assemblies include a faceplate welded to a club head. The faceplate has a slightly rounded shape in order to provide a straighter and/or longer flight path for a golf ball, even when the ball is struck off-center with respect to the faceplate. The faceplate has a bulge dimension, or curvature from a toe end to a heel end, and a roll dimension, or curvature from the crown edge to the sole edge.

Aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," and "having" and variations thereof herein is meant to encompass the items listed thereafter and equivalents thereof as well as additional items. All weight percent (wt %) numbers described below are a total weight percent.

DETAILED DESCRIPTION

Figure 1:
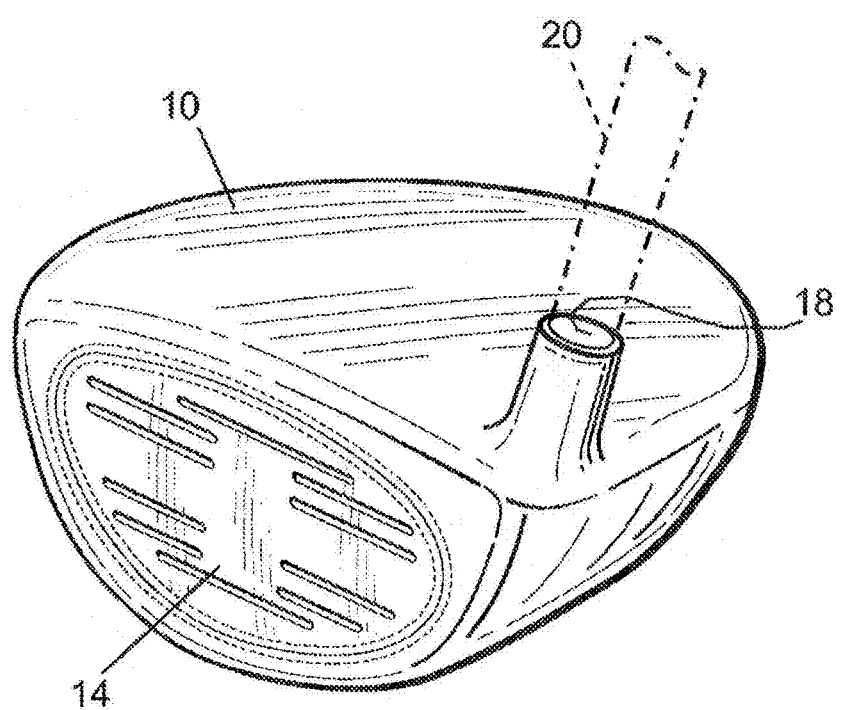
FIG. 1 is a perspective view of a club head and a face plate.
Figure 2:
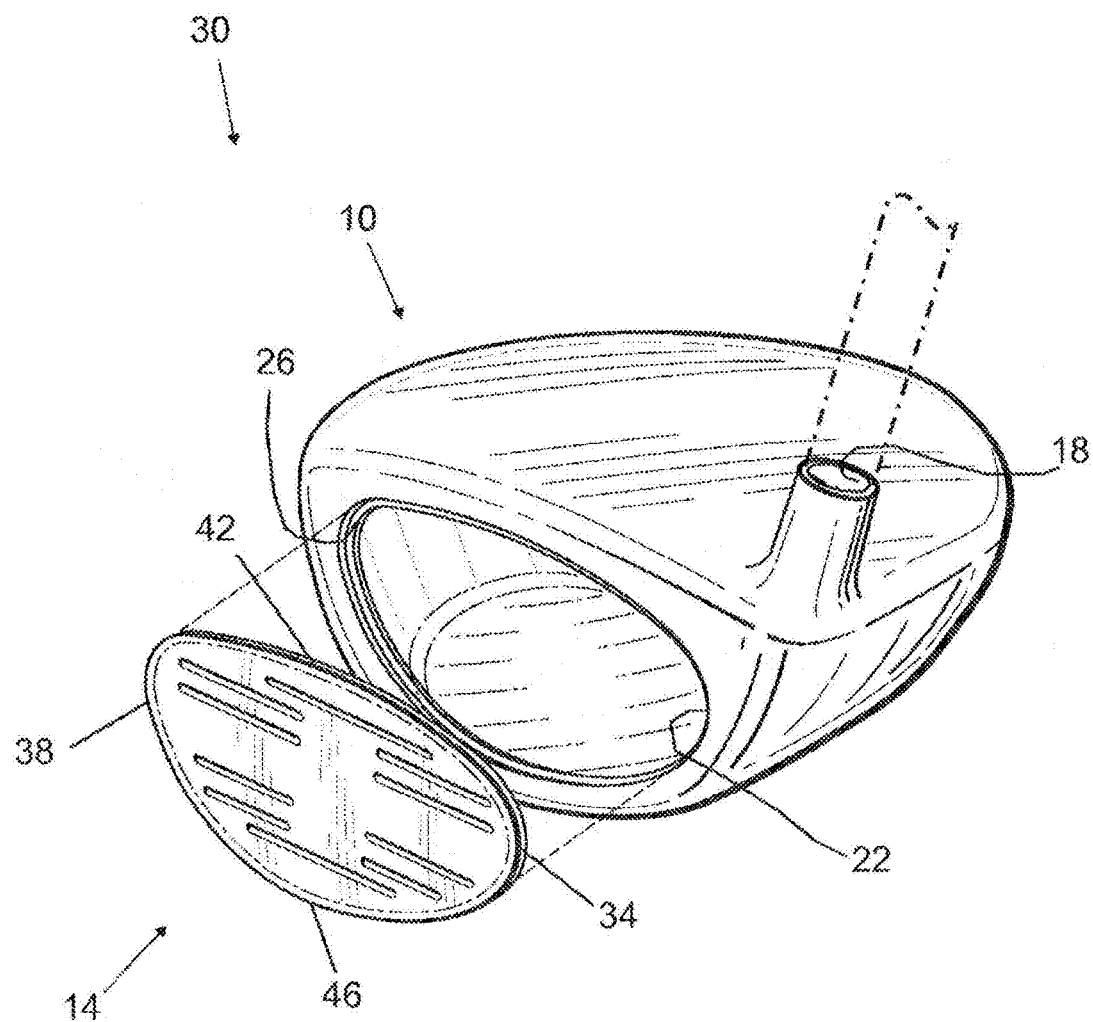
FIG. 2 is a perspective view of the club head with the face plate removed.
Figure 3:
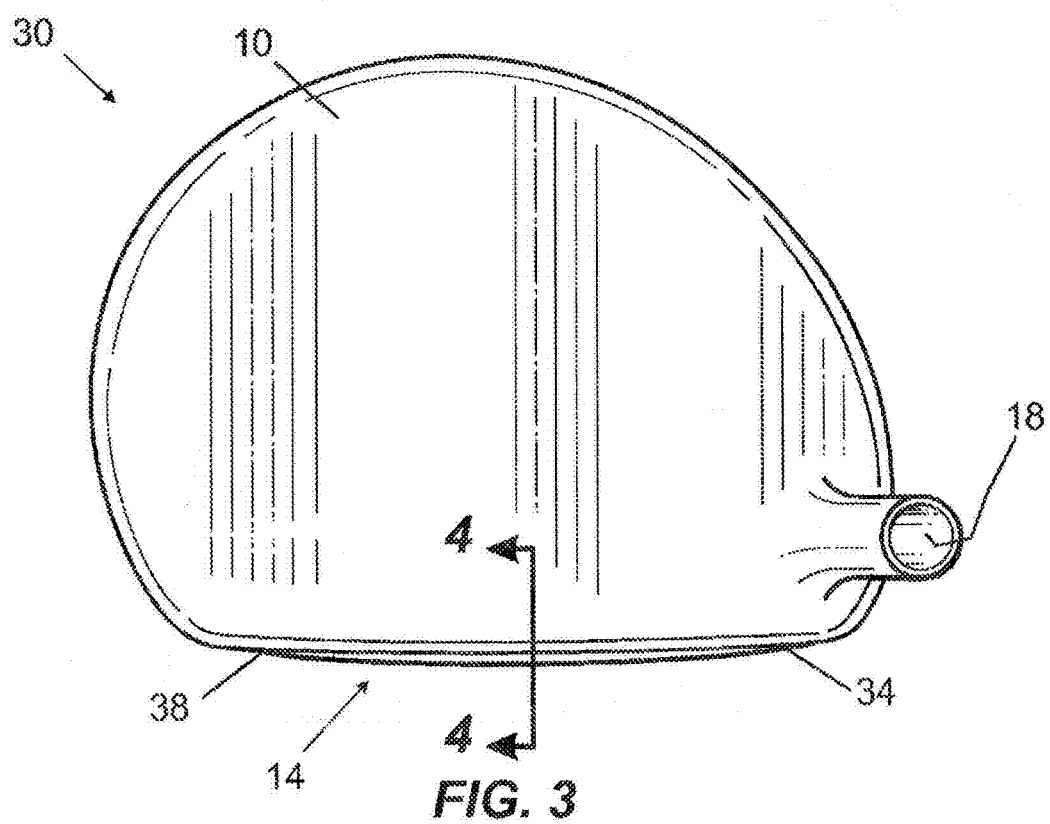
FIG. 3 is a top view of a club head assembly.

FIG. 1-3 shows a golf club head 10 and a faceplate 14. In one embodiment, the golf club head 10 is formed from a cast material and the faceplate 14 is formed from a rolled material. Further, in the illustrated embodiment, the golf club head 10 is for a metal wood driver; in other embodiments, the golf club head 10 is for a fairway wood; in other embodiments, the golf club head 10 is for hybrid clubs; in other embodiments, the golf club head 10 is for an iron club. The club head 10 may also include a hosel and a hosel transition (shown as 18). For example, the hosel may be located at or proximate to the heel end 34. The hosel may extend from the club head 10 via the hosel transition 18. To form a golf club, the hosel may receive a first end of a shaft 20. The shaft 20 may be secured to the golf club head 10 by an adhesive bonding process (e.g., epoxy) and/or other suitable bonding processes (e.g., mechanical bonding, soldering, welding, and/or brazing). Further, a grip (not shown) may be secured to a second end of the shaft 20 to complete the golf club.

As shown in FIG. 2, the club head 10 further includes a recess or opening 22 for receiving the faceplate 14. In the illustrated embodiment, the opening 22 includes a lip 26 extending around the perimeter of the opening 22. The faceplate 14 is aligned with the opening and abuts the lip 26. The faceplate 14 is secured to the club head 10 by welding, forming a club head assembly 30. In one embodiment, the welding is a pulse plasma welding process.

Figure 4:
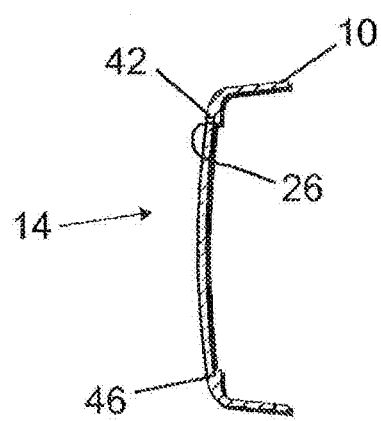
FIG. 4 is a side section view of the club head assembly of FIG. 3 along section 4-4.
Figure 5:
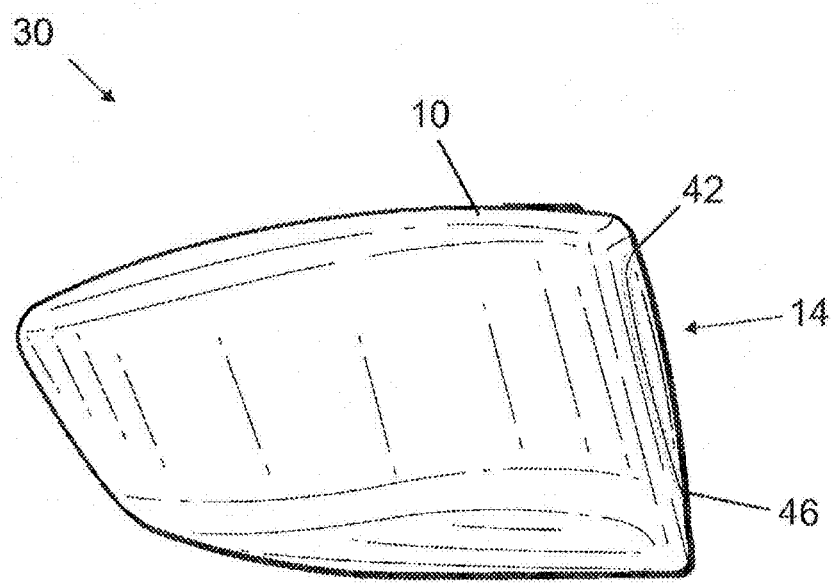
FIG. 5 is a side view of the club head assembly of FIG. 3.

The faceplate 14 includes a heel end 34 and a toe end 38 opposite the heel end 34. The heel end 34 is positioned proximate the hosel portion (hosel and hosel transition 18)

where the shaft 20 (FIG. 1) is coupled to the club head assembly 30. The faceplate 14 further includes a crown edge 42 and a sole edge 46 opposite the crown edge 42. The crown edge 42 is positioned adjacent an upper edge of the club head 10, while the sole edge 46 is positioned adjacent the lower edge of the club head 10. As shown in FIG. 3, the faceplate 14 has a bulge curvature in a direction extending between the heel end 34 and the toe end 38. As shown in FIGS. 4 and 5, the faceplate 14 also has a roll curvature in a direction extending between the crown edge 42 and the sole edge 46. In one embodiment, the faceplate may have a minimum wall thickness of 1.5 millimeters, 1.4 millimeters, 1.3 millimeters, 1.2 millimeters, 1.1 millimeters, 1.0 millimeters, 0.9 millimeters, 0.8 millimeters, 0.7 millimeters, 0.6 millimeters, 0.5 millimeters and 0.4 millimeters. In one embodiment, the faceplate may have a minimum wall thickness of 0.7 millimeters.

The faceplate 14 is formed from a titanium alloy. In one embodiment, the faceplate 14 is an α-β titanium (α-β Ti) alloy. The α-β Ti alloy may contain neutral alloying elements such as tin and α stabilizers such as aluminum and oxygen. The α-β Ti alloy may contain β-stabilizers such as molybdenum, silicon and vanadium. All numbers described below regarding weight percent are a total weight percent (wt %). The total weight percent of α-stabilizer aluminum in α-β Ti alloy may be between 2 wt % to 10 wt %, 3 wt % to 9 wt %, 4 wt % to 8 wt %, 5 wt % to 7 wt %, 2 wt % to 20 wt %, 3 wt % to 19 wt %, 4 wt % to 18 wt %, 5 wt % to 17 wt %, 6 wt % to 16 wt %, 7 wt % to 15 wt %, 8 wt % to 14 wt %, 9 wt % to 13 wt %, 10 wt % to 12 wt %, 7 wt % to 9 wt %, 7 wt % to 10 wt %, 7 wt % to 11 wt %, 7 wt % to 12 wt %, 7 wt % to 13 wt %, 7 wt % to 14 wt %, 7 wt % to 15 wt %, 7 wt % to 16 wt %, 7 wt % to 17 wt %, 7 wt % to 18 wt %, 7 wt % to 19 wt %, 7 wt % to 20 wt %, 8 wt % to 10 wt %, 8 wt % to 11 wt %, 8 wt % to 12 wt %, 8 wt % to 13 wt %, 8 wt % to 14 wt %, 8 wt % to 15 wt %, 8 wt % to 16 wt %, 8 wt % to 17 wt %, 8 wt % to 18 wt %, 8 wt % to 19 wt %, 8 wt % to 20 wt %, 9 wt % to 11 wt %, 9 wt % to 12 wt %, 9 wt % to 13 wt %, 9 wt % to 14 wt %, 9 wt % to 15 wt %, 9 wt % to 16 wt %, 9 wt % to 17 wt %, 9 wt % to 18 wt %, 9 wt % to 19 wt %, 9 wt % to 20 wt %, 10 wt % to 13 wt %, 10 wt % to 14 wt %, 10 wt % to 15 wt %, 10 wt % to 16 wt %, 10 wt % to 17 wt %, 10 wt % to 18 wt %, 10 wt % to 19 wt %, 10 wt % to 20 wt %, 11 wt % to 13 wt %, 11 wt % to 14 wt %, 11 wt % to 15 wt %, 11 wt % to 16 wt %, 11 wt % to 17 wt %, 11 wt % to 18 wt %, 11 wt % to 19 wt %, 11 wt % to 20 wt %, 12 wt % to 14 wt %, 12 wt % to 15 wt %, 12 wt % to 16 wt %, 12 wt % to 17 wt %, 12 wt % to 18 wt %, 12 wt % to 19 wt %, 12 wt % to 20 wt %, 13 wt % to 15 wt %, 13 wt % to 16 wt %, 13 wt % to 17 wt %, 13 wt % to 18 wt %, 13 wt % to 19 wt %, 13 wt % to 20 wt %, 14 wt % to 16 wt %, 14 wt % to 17 wt %, 14 wt % to 18 wt %, 14 wt % to 19 wt %, 14 wt % to 20 wt %, 15 wt % to 17 wt %, 15 wt % to 18 wt %, 15 wt % to 19 wt %, 15 wt % to 20 wt %, 16 wt % to 18 wt %, 16 wt % to 19 wt %, 16 wt % to 20 wt %, 17 wt % to 19 wt %, 17 wt % to 20 wt %, or 18 wt % to 20 wt %. In certain embodiments, the total weight percent of α-stabilizer aluminum in α-β Ti alloy may be between 7 wt % to 13 wt %, 8 wt % to 13 wt %, 9 wt % to 13 wt %, 10 wt % to 13 wt %, 11 wt % to 13 wt %, or 12 wt % to 13 wt %. The total weight percent of α-stabilizer oxygen in α-β Ti alloy may be between 0.05 wt % to 0.35 wt %, or 0.10 wt % to 0.20 wt %. The total weight percent of β-stabilizer molybdenum in α-β Ti alloy may be between 0.2 wt % to 1.0 wt %, or 0.6 wt % to 0.8 wt %, or trace amounts. The total weight percent of β-stabilizer vanadium in α-β Ti alloy may be between 1.5 wt % to 7 wt %, or 3.5 wt % to 4.5 wt %. The total weight percent of β-stabilizer silicon in α-β Ti alloy may be between 0.01 to 0.10 wt %, or 0.03 wt % to 0.07 wt %. The α-β Ti alloy may be Ti-6Al-4V (or Ti 6-4), Ti-7S+(or Ti-7S, T-7S, or ST721), Ti-9S (or T-9S), Ti-662, Ti-8-1-1, Ti-65K, Ti-6246, Ti-7S, or IMI 550. The combination of α, β stabilizers allows the α-β Ti alloys to be heat treated.

In one embodiment, after welding the faceplate 14 to the club head 10, the club head 10 and faceplate 14 may be heated to a temperature at, just above, or greater than the solvus temperature of the faceplate for a predetermined amount of time. In another embodiment, after welding the faceplate 14 to the club head 10, the club head assembly 30 may be heat treated at a temperature at, just above or greater than the α-β Ti solvus temperature for a predetermined amount of time. In another embodiment, after welding the faceplate 14 to the club head 10, the club head assembly 30 may be heat treated at a temperature at, just above or greater than the α-β Ti solvus temperature for a predetermined amount of time. Also, during this step, an inert gas may be pumped into the heating chamber housing the club head assembly 30 to remove all oxygen over a predetermined amount of time discussed below. Upon cooling of the club head assembly 30 as discussed below, additional inert gas may be pumped back into the chamber where the club head assembly 30 is allowed to cool to room temperature.

As discussed above, after heating the club head assembly 30 (or the club head 10 and the welded faceplate 14), the club head assembly 30 is allowed to cool to room temperature. In another embodiment, after the heat treatment, the club head assembly 30 may be allowed to air cool to slowly reduce the club head assembly's temperature. The cooling of the club head assembly 30 may be done in an inert gas environment or non-contained environment (open air). In another embodiment, the club head assembly 30 may be allowed to cool in inert gas to slowly reduce the club head assembly's temperature and reduce chance for oxidation. The inert gas may be selected from the group consisting of nitrogen (N), argon (Ar), helium (He), neon (Ne), krypton (Kr), and xenon (Xe) or a compound gas thereof. After heating to, just above, or greater than the α-β Ti solvus temperature, inert gas may be pumped back into a chamber under vacuum housing the club assembly 30, which ensures no oxygen is present to prevent oxidation to the titanium faceplate 14 and club head surfaces 10.

As understood by a person of ordinary skill, the solvus temperature for an alloy is the temperature barrier at which smaller constituent molecules dissolve within the general matrix of the material and become more mobile. The solvus temperatures of most α-β Ti alloys are verified and readily available in academic literature or information published by material suppliers. If published data is unavailable, the temperature values can be estimated and experimentally confirmed, since it is dependent on the material's chemistry. The solvus temperature for α-β Ti can be above 400° C. and below 600° C., above 400° C. and below 1180° C. In certain embodiments, the solvus temperature for α-β Ti alloy can be between 500° C. and 1030° C., 680° C. and 1030° C., 760° C. and 1030° C., 870° C. and 1030° C., 895° C. and 1030° C., or 960° C. and 1030° C.

In one embodiment, the α-β Ti may be Ti 6-4 containing 6 wt % aluminum (Al), and 4 wt % vanadium (V), with the remaining alloy composition being titanium and possibly some trace elements. In some embodiments, Ti 6-4 contains between 5.5 wt %-6.75 wt % Al, between 3.5 wt %-4.5 wt % V, a maximum of 0.08 wt % carbon (C), a maximum of 0.03 wt % silicon (Si), a maximum of 0.3 wt % iron (Fe), a maximum of 0.2 wt % oxygen (O), a maximum of 0.015 wt % tin (Sn), and trace amounts of molybedenum (Mo), with the remaining alloy composition being titanium. In some embodiments, Ti 6-4 contains between 5.5 wt %-6.75 wt % Al, between 3.5 wt %-4.5 wt % V, 0.08 wt % or less carbon (C), 0.03 wt % or less silicon (Si), 0.3 wt % or less iron (Fe), 0.2 wt % or less oxygen (0), 0.015 wt % or less tin (Sn), and trace amounts of molybedenum (Mo), with the remaining alloy composition being titanium. Ti 6-4 is a grade 5 titanium. The solvus temperature for Ti 6-4 is between 540° C. and 560° C. In some embodiments, Ti 6-4 has a density of 0.1597 lb/in$^3$ (4.37 g/cc). Ti-6-4 may also be designated as T-65K.

In one embodiment, the α-β Ti may be Ti-7S$^+$ (or Ti-7S, T-7S, or ST721), containing between 7-8 wt % aluminum (Al), between 2-3 wt % molybdenum (Mo), between 0.5-1.5 wt % iron (Fe), between 0.5-1.5 wt % vanadium (Vn), with the remaining alloy composition being titanium and other trace elements. In one embodiment, the α-β Ti may be Ti-7S$^+$ (or Ti-7S, T-7S, or ST721), containing between 7-20 wt % aluminum (Al), between 1.5-5.0 wt % molybdenum (Mo), between 0.3-2.0 wt % iron (Fe), between 0.3-2.0 wt % vanadium (Vn), with the remaining alloy composition being titanium and other trace elements. In some embodiments, trace elements of the optimized titanium alloy comprising Ti-7S$^+$ can include 0.25 wt % silicon or less, 0.20 wt % oxygen or less, 0.05 wt % carbon or less, and 0.04 wt % nitrogen or less. The solvus temperature for Ti-7S$^+$ may be between 720° C. and 760° C. The solvus temperature for Ti-7S$^+$ may be 740° C. In this example, the density of Ti 7S is 0.162 lb/in$^3$ (4.47 g/cm$^3$).

In other embodiments, the golf club head 10 may be α-β Ti alloy, such as Ti-9S (or T-9S), which contains 8 wt % Al, 1 wt % V, and 0.2 wt % Si, with the remaining alloy composition being titanium and possibly some trace elements. In some embodiments, Ti-9S (or T-9S) contains 6.5 wt %-8.5 wt % Al, between 1 wt %-2 wt % V, a maximum of 0.08 wt % C, a maximum of 0.2 wt % Si, a maximum of 0.3 wt % Fe, a maximum of 0.2 wt % 0, a maximum of 0.05 wt % N, trace amounts of Mo, and trace amounts of Sn, with the remaining alloy composition being titanium. In some embodiments, Ti-9S (or T-9S) contains 6.5 wt %-8.5 wt % Al, between 1 wt %-2 wt % V, less than 0.1 wt % C, a maximum of 0.2 wt % Si, a maximum of 0.4 wt % Fe, a maximum of 0.15 wt % 0, less than 0.05 wt % N, trace amounts of Mo, and trace amounts of Sn, with the remaining alloy composition being titanium. In some embodiments, Ti-9S (or T-9S) contains 6.5 wt %-8.5 wt % Al, between 1 wt %-2 wt % V, 0.1 wt % or less C, 0.2 wt % or less Si, 0.4 wt % or less Fe, 0.15 wt % or less 0, less than 0.05 wt % N, trace amounts of Mo, and trace amounts of Sn, with the remaining alloy composition being titanium. The solvus temperature for Ti-9S (or T-9S) is between 560° C. and 590° C. In some embodiments, the Ti-9S (or T-9s) will have higher porosity and a lower yield than Ti 8-1-1. Ti-9S (or T-9S) has a density of about 0.156 lb/in$^3$ to 0.157 lb/in$^3$ (4.32-4.35 g/cc). Ti-9S (or T-9S) has a density of 0.156 lb/in$^3$ (4.32 g/cc).

In other embodiments, the material may be another α-β Ti alloy, such as Ti-6-6-2, Ti-6246, or IMI 550. Titanium 662 may contain 6 wt % Al, 6 wt % V, and 2 wt % Sn, with the remaining alloy composition being titanium and possibly some trace elements. Ti-6-6-2 has a density of 0.164 lb/in3 (4.54 g/cc). The solvus temperature for Ti 662 is between 540° C. and 560° C. Titanium 6246 may contain 6 wt % Al, 2 wt % Sn, 4 wt % zirconium (Zr), and 6 wt % Mo, with the remaining alloy composition being titanium and possibly some trace elements. The solvus temperature for Ti 6246 is between 570° C. and 590° C. Ti-6246 has a density of 0.168 lb/in3 (4.65 g/cc). IMI 550 may contain 6 wt % Al, 2 wt % Sn, 4 wt % Mo, and 0.5 wt % Si, with the remaining alloy composition being titanium and possibly some trace elements. The solvus temperature for IMI 550 is between 490° C. and 510° C. IMI 550 has a density of 0.157 lb/in$^3$ (4.60 g/cc).

In other embodiments, the material may be another α-β Ti alloy, such as Ti-8-1-1, which may contain 8 wt % Al, 1.0 wt % Mo, and 1 wt % V, with the remaining alloy composition being titanium and possibly some trace elements. In some embodiments, Ti-8-1-1 may contain 7.5 wt %-8.5 wt % Al, 0.75 wt %-1.25 wt % Mo., 0.75 wt %-1.25 wt % V, a maximum of 0.08 wt % C, a maximum of 0.3 wt % Fe, a maximum of 0.12 wt % 0, a maximum of 0.05 wt % N, a maximum of 0.015 wt % H, a maximum of 0.015 wt % Sn, and trace amounts of Si, with the remaining alloy composition being titanium. The solvus temperature for Ti-8-1-1 is between 560° C. and 590° C. In some embodiments, Ti-8-1-1 has a density of 0.1580 lb/in$^3$ (4.37 g/cc).

In other embodiments, the material may be another α-β Ti alloy which may contain 7 wt %-8 wt % Al with the remaining alloy composition being titanium and other α- and β-stabilizers. The solvus temperature for this α-β Ti is between 500° C. and 720° C.

In other embodiments, the material may be another α-β Ti alloy which may contain 8 wt %-9 wt % Al with the remaining alloy composition being titanium and other α- and β-stabilizers. The solvus temperature for this α-β Ti is between 680° C. and 810° C.

In other embodiments, the material may be another α-β Ti alloy which may contain 9 wt %-10 wt % Al with the remaining alloy composition being titanium and other α- and β-stabilizers. The solvus temperature for this α-β Ti is between 760° C. and 895° C.

In other embodiments, the material may be another α-β Ti alloy which may contain 10 wt %-11 wt % Al with the remaining alloy composition being titanium and other α- and β-stabilizers. The solvus temperature for this α-β Ti is between 870° C. and 910° C.

In other embodiments, the material may be another α-β Ti alloy which may contain 11 wt %-12 wt % Al with the remaining alloy composition being titanium and other α- and β-stabilizers. The solvus temperature for this α-β Ti is between 890° C. and 980° C.

In other embodiments, the material may be another α-β Ti alloy which may contain 12 wt %-13 wt % Al with the remaining alloy composition being titanium and other α- and β-stabilizers. The solvus temperature for this α-β Ti is between 960° C. and 1030° C.

In other embodiments, the material may be another α-β Ti alloy which may contain 13 wt %-14 wt % Al with the remaining alloy composition being titanium and other α- and β-stabilizers. The solvus temperature for this α-β Ti is between 980° C. and 1070° C.

In other embodiments, the material may be another α-β Ti alloy which may contain 14 wt %-15 wt % Al with the remaining alloy composition being titanium and other α- and β-stabilizers. The solvus temperature for this α-β Ti is between 1030° C. and 1100° C.

In other embodiments, the material may be another α-β Ti alloy which may contain 16 wt %-17 wt % Al with the remaining alloy composition being titanium and other α- and β-stabilizers. The solvus temperature for this α-β Ti is between 1100° C. and 1140° C.

In other embodiments, the material may be another α-β Ti alloy which may contain 17 wt %-18 wt % Al with the remaining alloy composition being titanium and other α- and β-stabilizers. The solvus temperature for this α-β Ti is between 1140° C. and 1150° C.

In other embodiments, the material may be another α-β Ti alloy which may contain 18 wt %-19 wt % Al with the remaining alloy composition being titanium and other α- and β-stabilizers. The solvus temperature for this α-β Ti is between 1150° C. and 1180° C.

In other embodiments, the material may be another α-β Ti alloy which may contain 19 wt %-20 wt % Al with the remaining alloy composition being titanium and other α- and β-stabilizers. The solvus temperature for this α-β Ti is between 1170° C. and 1180° C.

In other embodiments, the material may be another α-β Ti alloy which may contain 7 wt %-13 wt % Al with the remaining alloy composition being titanium and other α- and β-stabilizers. The solvus temperature for this α-β Ti is between 500° C. and 1030° C.

In other embodiments, the material may be another α-β Ti alloy which may contain 8 wt %-13 wt % Al with the remaining alloy composition being titanium and other α- and β-stabilizers. The solvus temperature for this α-β Ti is between 680° C. and 1030° C.

In other embodiments, the material may be another α-β Ti alloy which may contain 9 wt %-13 wt % Al with the remaining alloy composition being titanium and other α- and β-stabilizers. The solvus temperature for this α-β Ti is between 760° C. and 1030° C.

In other embodiments, the material may be another α-β Ti alloy which may contain 10 wt %-13 wt % Al with the remaining alloy composition being titanium and other α- and β-stabilizers. The solvus temperature for this α-β Ti is between 870° C. and 1030° C.

In other embodiments, the material may be another α-β Ti alloy which may contain 11 wt %-13 wt % Al with the remaining alloy composition being titanium and other α- and β-stabilizers. The solvus temperature for this α-β Ti is between 890° C. and 1030° C.

In other embodiments, the material may be another α-β Ti alloy which may contain 12 wt %-13 wt % Al with the remaining alloy composition being titanium and other α- and β-stabilizers. The solvus temperature for this α-β Ti is between 960° C. and 1030° C.

Figure 6:
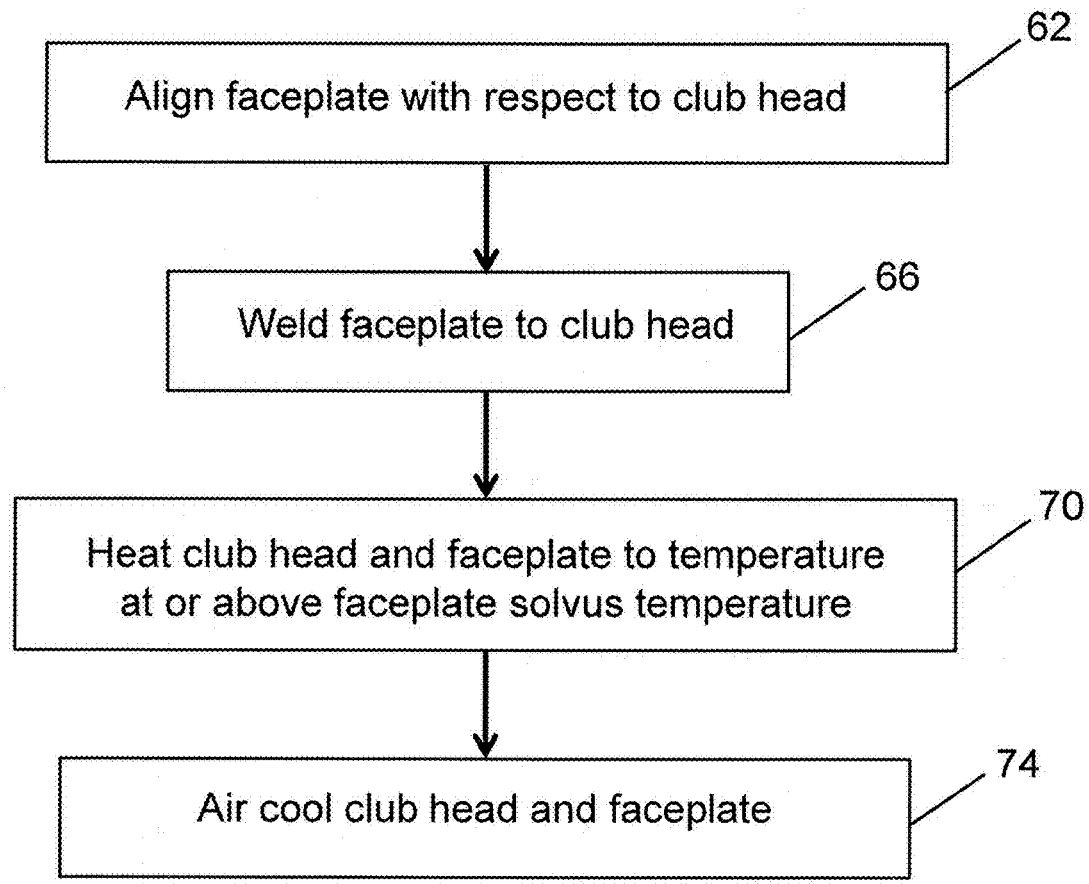
FIG. 6 is a schematic view of a process for forming a golf club head assembly.

FIG. 6 shows the process for forming for the club head assembly 30. In the first step 62, the faceplate 14 is aligned with respect to the club head 10. The second step 66 involves welding the faceplate 14 to the club head 10. In the third step 70, the club head 10 and the faceplate 14 are heated to a temperature at or above the solvus temperature of the faceplate 14 material. Finally, in the fourth step 74 the club head 10 and the faceplate 14 are air cooled.

In one embodiment, the club head assembly 30 is heat treated at a temperature at or above the solvus temperature of the α-β Ti alloy for between 1 hour and 6 hours in the third step 70. In one embodiment, the club head assembly 30 is heat treated at a temperature at or above the solvus temperature of the α-β Ti alloy for between 1 hour and 2 hours in the third step 70. In one embodiment, the club head assembly 30 is heat treated at a temperature at or above the solvus temperature of the α-β Ti alloy for between 1 hour and 4 hours in the third step 70. In one embodiment, the club head assembly 30 is heat treated at a temperature at or above the solvus temperature of the α-β Ti alloy for between 4 hours and 6 hours in the third step 70. In one embodiment, the club head assembly 30 is heat treated at a temperature at or above the solvus temperature of the α-β Ti alloy for between 1.5 hours and 5.5 hours in the third step 70. In one embodiment, the club head assembly 30 is heat treated at a temperature at or above the solvus temperature of the α-β Ti alloy for between 2 hours and 5 hours in the third step 70. In one embodiment, the club head assembly 30 is heat treated at a temperature at or above the solvus temperature of the α-β Ti alloy for between 2.5 hours and 4.5 hours in the third step 70. In one embodiment, the club head assembly 30 is heat treated at a temperature at or above the solvus temperature of the α-β Ti alloy for between 3 hours and 4 hours in the third step 70.

In one embodiment, the club head assembly 30 is heat treated at a temperature at or above the solvus temperature of the α-β Ti alloy for at least 1 hour in the third step 70. In one embodiment, the club head assembly 30 is heat treated at a temperature at or above the solvus temperature of the α-β Ti alloy for at least 1.5 hours in the third step 70. In one embodiment, the club head assembly 30 is heat treated at a temperature at or above the solvus temperature of the α-β Ti alloy for at least 2 hours in the third step 70. In one embodiment, the club head assembly 30 is heat treated at a temperature at or above the solvus temperature of the α-β Ti alloy for at least 2.5 hours in the third step 70. In one embodiment, the club head assembly 30 is heat treated at a temperature at or above the solvus temperature of the α-β Ti alloy for at least 3 hours in the third step 70. In one embodiment, the club head assembly 30 is heat treated at a temperature at or above the solvus temperature of the α-β Ti alloy for at least 3.5 hours in the third step 70. In one embodiment, the club head assembly 30 is heat treated at a temperature at or above the solvus temperature of the α-β Ti alloy for at least 4 hours in the third step 70. In one embodiment, the club head assembly 30 is heat treated at a temperature at or above the solvus temperature of the α-β Ti alloy for at least 4.5 hours in the third step 70. In one embodiment, the club head assembly 30 is heat treated at a temperature at or above the solvus temperature of the α-β Ti alloy for at least 5 hours in the third step 70. In one embodiment, the club head assembly 30 is heat treated at a temperature at or above the solvus temperature of the α-β Ti alloy for at least 5.5 hours in the third step 70. In one embodiment, the club head assembly 30 is heat treated at a temperature at or above the solvus temperature of the α-β Ti alloy for at least 6 hours in the third step 70.

In one embodiment, the club head assembly 30 is heat treated between 400° C. and 630° C., between 400° C. and 1200° C., or between 500° C. and 1030° C. in the third step 70. In one embodiment, the club head assembly 30 is heat treated between 425° C. and 550° C., between 425° C. and 1200° C., or between 525° C. and 1030° C. In one embodiment, the club head assembly 30 is heat treated between 450° C. and 525° C., between 450° C. and 1095° C., or between 550° C. and 925° C. in the third step 70. In one embodiment, the club head assembly 30 is heat treated between 550° C. and 625° C., between 550° C. and 1195° C., or between 650° C. and 925° C. in the third step 70. In one embodiment, the club head assembly 30 is heat treated between 520° C. and 1200° C. in the third step 70. In one embodiment, the club head assembly 30 is heat treated between 620° C. and 1150° C. in the third step 70. In one embodiment, the club head assembly 30 is heat treated between 720° C. and 1000° C. in the third step 70. In one embodiment, the club head assembly 30 is heat treated between 820° C. and 950° C. in the third step 70. In one embodiment, the club head assembly 30 is heat treated between 720° C. and 900° C. in the third step 70. In one embodiment, the club head assembly 30 is heat treated between 820° C. and 850° C. in the third step 70. In one embodiment, the club head assembly 30 is heat treated at 400° C., 410° C., 420° C., 430° C., 440° C., 450° C., 460° C., 470° C., 480° C., 490° C., 500° C., 510° C., 520° C., 530° C., 540° C., 550° C., 560° C., 570° C., 580° C., 590° C., 600° C., 610° C., 620° C., 630° C., 640° C., 650° C., 660° C., 670° C., 680° C., 690° C., 700° C., 710° C., 720° C., 730° C., 740° C., 750° C., 760° C., 770° C., 780° C., 790° C., 800° C., 810° C., 820° C., 830° C., 840° C., 850° C., 860° C., 870° C., 880° C., 890° C., 900° C., 910° C., 920° C., 930° C., 940° C., 950° C., 960° C., 970° C., 980° C., 990° C., 1000° C., 1010° C., 1020° C., 1030° C., 1040° C., 1050° C., 1060° C., 1070° C., 1080° C., 1090° C., 1100° C., 1110° C., 1120° C., 1130° C., 1140° C., 1150° C., 1160° C., 1170° C., 1180° C., 1190° C., or 1200° C. in the third step 70 for 30 minutes, 60 minutes, 90 minutes, 120 minutes, 150 minutes, 180 minutes, 210 minutes, 240 minutes, 270 minutes, 300 minutes, 330 minutes or 360 minutes.

In one embodiment, the club head assembly 30 is heat treated at a temperature of at least 400° C. in the third step 70. In one embodiment, the club head assembly 30 is heat treated at a temperature of at least 420° C. in the third step 70. In one embodiment, the club head assembly 30 is heat treated at a temperature of at least 440° C. in the third step 70. In one embodiment, the club head assembly 30 is heat treated at a temperature of at least 460° C. in the third step 70. In one embodiment, the club head assembly 30 is heat treated at a temperature of at least 475° C. in the third step 70. In one embodiment, the club head assembly 30 is heat treated at a temperature of at least 480° C. in the third step 70. In one embodiment, the club head assembly 30 is heat treated at a temperature of at least 500° C. in the third step 70. In one embodiment, the club head assembly 30 is heat treated at a temperature of at least 520° C. in the third step 70. In one embodiment, the club head assembly 30 is heat treated at a temperature of at least 540° C. in the third step 70. In one embodiment, the club head assembly 30 is heat treated at a temperature of at least 560° C. in the third step 70. In one embodiment, the club head assembly 30 is heat treated at a temperature of at least 575° C. in the third step 70. In one embodiment, the club head assembly 30 is heat treated at a temperature of at least 580° C. In one embodiment, the club head assembly 30 is heat treated at a temperature of at least 600° C. in the third step 70. In one embodiment, the club head assembly 30 is heat treated at a temperature of at least 620° C. in the third step 70. In one embodiment, the club head assembly 30 is heat treated at a temperature of at least 625° C. in the third step 70. In one embodiment, the club head assembly 30 is heat treated at a temperature of at least 630° C. in the third step 70. In one embodiment, the club head assembly 30 is heat treated at a temperature of at least 640° C. in the third step 70. In one embodiment, the club head assembly 30 is heat treated at a temperature of at least 660° C. in the third step 70. In one embodiment, the club head assembly 30 is heat treated at a temperature of at least 675° C. in the third step 70. In one embodiment, the club head assembly 30 is heat treated at a temperature of at least 680° C. in the third step 70. In one embodiment, the club head assembly 30 is heat treated at a temperature of at least 700° C. in the third step 70. In one embodiment, the club head assembly 30 is heat treated at a temperature of at least 720° C. in the third step 70. In one embodiment, the club head assembly 30 is heat treated at a temperature of at least 740° C. in the third step 70. In one embodiment, the club head assembly 30 is heat treated at a temperature of at least 760° C. in the third step 70. In one embodiment, the club head assembly 30 is heat treated at a temperature of at least 775° C. in the third step 70. In one embodiment, the club head assembly 30 is heat treated at a temperature of at least 780° C. in the third step 70. In one embodiment, the club head assembly 30 is heat treated at a temperature of at least 800° C. in the third step 70. In one embodiment, the club head assembly 30 is heat treated at a temperature of at least 820° C. in the third step 70. In one embodiment, the club head assembly 30 is heat treated at a temperature of at least 840° C. in the third step 70. In one embodiment, the club head assembly 30 is heat treated at a temperature of at least 860° C. in the third step 70. In one embodiment, the club head assembly 30 is heat treated at a temperature of at least 875° C. in the third step 70. In one embodiment, the club head assembly 30 is heat treated at a temperature of at least 880° C. in the third step 70. In one embodiment, the club head assembly 30 is heat treated at a temperature of at least 900° C. in the third step 70. In one embodiment, the club head assembly 30 is heat treated at a temperature of at least 920° C. in the third step 70. In one embodiment, the club head assembly 30 is heat treated at a temperature of at least 940° C. in the third step 70. In one embodiment, the club head assembly 30 is heat treated at a temperature of at least 960° C. in the third step 70. In one embodiment, the club head assembly 30 is heat treated at a temperature of at least 975° C. in the third step 70. In one embodiment, the club head assembly 30 is heat treated at a temperature of at least 980° C. in the third step 70. In one embodiment, the club head assembly 30 is heat treated at a temperature of at least 1000° C. in the third step 70. In one embodiment, the club head assembly 30 is heat treated at a temperature of at least 1020° C. in the third step 70. In one embodiment, the club head assembly 30 is heat treated at a temperature of at least 1040° C. in the third step 70. In one embodiment, the club head assembly 30 is heat treated at a temperature of at least 1060° C. in the third step 70. In one embodiment, the club head assembly 30 is heat treated at a temperature of at least 1075° C. in the third step 70. In one embodiment, the club head assembly 30 is heat treated at a temperature of at least 1080° C. in the third step 70. In one embodiment, the club head assembly 30 is heat treated at a temperature of at least 1100° C. in the third step 70. In one embodiment, the club head assembly 30 is heat treated at a temperature of at least 1120° C. in the third step 70. In one embodiment, the club head assembly 30 is heat treated at a temperature of at least 1140° C. in the third step 70. In one embodiment, the club head assembly 30 is heat treated at a temperature of at least 1160° C. in the third step 70. In one embodiment, the club head assembly 30 is heat treated at a temperature of at least 1175° C. in the third step 70. In one embodiment, the club head assembly 30 is heat treated at a temperature of at least 1180° C. in the third step 70. In one embodiment, the club head assembly 30 is heat treated at a temperature of at least 1200° C. in the third step 70.

In one embodiment, the club head assembly 30 is heat treated between 475° C. and 500° C. for between 4 hours and 6 hours in the third step 70. In another embodiment, the club head is heat treated between 575° C. and 625° C. for between 1 hour and 2 hours in the third step 70. In another embodiment, the club head is heat treated at about 550° C. for between 1 hour and 4 hours. In other embodiments, the face plate 14 may be formed from a different alloy in the third step 70. In other embodiments, the heat treatment process may be implemented at other temperatures for a different amount of time. In addition, the heat treatment may be applied to a variety of materials and a variety of weld-types.

Unlike conventional club head metal aging processes that occur at low temperature, heat-treating the club head assembly 30 above the solvus temperature after welding the faceplate 14 relieves stresses in the faceplate 14 and between the weld and the metal matrix of the club head 10. The post-weld stress relief disperses stresses associated with the weld-metal heat affected zone (HAZ), or the area around the weld in which the material properties have been altered due to the welding process. Because of the stark contrast in mechanical properties between the HAZ and the rest of the metal matrix, the HAZ is much more likely to experience a crack and fail. Previous post-weld treatments were performed below the solvus temperature for a short duration of time. These processes simply aged the metals, but did not address the increased stresses transferred to the weld area. Furthermore, the faceplate was not sufficiently strong and would flatten or lose its curvature relatively quickly. In contrast, the heat treatment above the solvus temperature disperses stresses in the weld metal HAZ. The heat-treatment improves the durability of the HAZ by relieving the stresses. In addition, heat-treating the club head assembly 30 above the solvus temperature reduces the possibility of generating titanium-aluminum ($Ti_3Al$) crystals along the weld.

The grains of the faceplate alloy may be aligned in a crown to sole orientation prior to heat treating. The crown to sole orientation of the alloy grains permits stretching in the same direction. In some embodiments, the grains of the faceplate $\alpha$-$\beta$ titanium ($\alpha$-$\beta$ Ti) alloy may be aligned in a crown to sole orientation prior to heat treating. The crown to sole orientation of the $\alpha$-$\beta$ Ti alloy grains permits stretching in the same direction. In some embodiments, the grains of the faceplate disclosed $\alpha$-$\beta$ Ti alloys (e.g., Ti-6Al-4V (or Ti 6-4), Ti-7S+ (or Ti-7S, T-7S, or ST721), Ti-9S (or T-9S), Ti-662, Ti-8-1-1, Ti-65K, Ti-6246, and IMI 550 alloy) may be aligned in a crown to sole orientation prior to heat treating. The crown to sole orientation of the disclosed $\alpha$-$\beta$ Ti alloys (e.g., Ti-6Al-4V (or Ti 6-4), Ti-7S+ (or Ti-7S, T-7S, or ST721), Ti-9S (or T-9S), Ti-662, Ti-8-1-1, Ti-65K, Ti-6246, or IMI 550 alloy) grains permits stretching in the same direction.

The heat treatment also improves the toughness or durability of the faceplate 14. The improved toughness permits the faceplate 14 to be made thinner without sacrificing durability, thereby reducing club head weight. The reduced weight of faceplate 14 shifts the center of gravity of the club head assembly 30, and allows additional weight to be added to another component of the club to further adjust the center of gravity. Increasing the durability of the faceplate 14 permits the faceplate 14 to endure a significantly higher number of hits against a golf ball and maintain the faceplate's slightly bowed or rounded shape over the life of the club while sustaining hundreds or thousands of golf ball strikes. Therefore, the club is more forgiving when a ball is struck off-center because the rounded shape of the faceplate 14 provides a "gear effect" between the ball and faceplate 14.

Figure 7:
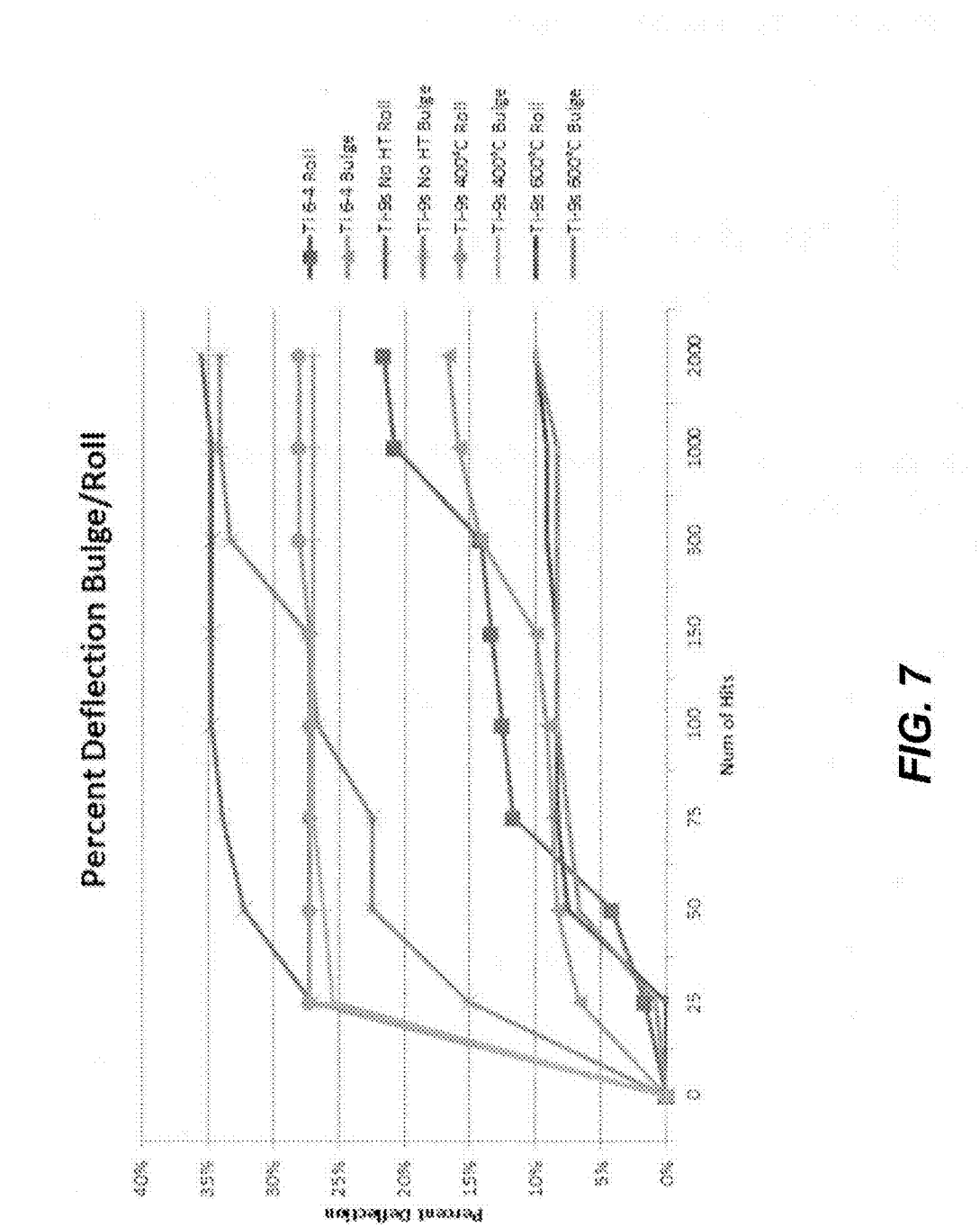
FIG. 7 is a chart showing experimental bulge and roll measurements for faceplates that are subjected to various heat-treatment processes.

As shown in FIG. 7, an experiment was performed to compare the effect of various heat treatment temperatures on the faceplate 14 over the course of 2,000 hits or ball strikes. The faceplates 14 were formed from Ti-9S (or T-9S) alloy. One club head assembly was heated to 400° C., which is below the solvus temperature of the Ti-9S (or T-9S) alloy. A second club head assembly was heated to 600° C., which is above the solvus temperature of the Ti-9S (or T-9S) alloy. The measurement data provided in FIG. 7 represent the percent change in the radius of curvature of the bulge and the roll dimensions compared to the original radius curvature. As the faceplate becomes more flat, the radius of curvature increases. The club head assembly having a faceplate 14 with Ti-9S treated at 400° C. flattened significantly in both its roll and bulge dimensions within 25 hits on a golf ball. In contrast, the club head assembly having a Ti-9S faceplate treated at 600° C. maintained its curvature significantly better than the first club head assembly after 2,000 hits. The Ti-9S faceplate treated at 600° C. maintained its curvature in both bulge and roll dimensions better after 2,000 hits than the first club head assembly having a faceplate 14 of untreated Ti-6-4.

For heat treatments below the solvus temperature (for example, at 400° C.), $Ti_3Al$ particles become more mobile and can precipitate into the $\alpha$-matrix. Some of the $Ti_3Al$ particles gather at grain boundaries and age harden the material. In contrast, for heat treatments above the solvus temperature (for example, at 600° C.), $Ti_3Al$ particles instead dissolve within the $\alpha$-matrix. The brittle $Ti_3Al$ particles can act as points of stress. Dissolving brittle $Ti_3Al$ particles within the $\alpha$-matrix thereby acts as a stress relief. This "stress relief" process enables the club head assembly 30 to better withstand tensile and compressive forces during impact against a golf ball.

In one embodiment, the faceplate 14 that is formed from Ti-9S (or T-9S) and heat treated above the solvus temperature of Ti-9S (or T-9S) remains within 2% deflection of its original bulge and roll curvature after about 25 strikes. In one embodiment, the faceplate 14 that is formed from Ti 6-4 and heat treated above the solvus temperature of Ti 6-4 remains within 3% deflection of its original roll curvature and within 8% deflection of its original bulge curvature after about 25 strikes.

In one embodiment, the faceplate 14 that is formed from Ti-9S (or T-9S) and heat treated above the solvus temperature of Ti-9S (or T-9S) remains within 8% deflection of its original bulge and roll curvature after about 50 strikes. In one embodiment, the faceplate 14 that is formed from Ti 6-4 and heat treated above the solvus temperature of Ti 6-4 remains within 5% deflection of its original roll curvature and within 10% deflection of its original bulge curvature after about 50 strikes.

In one embodiment, the faceplate 14 that is formed from Ti-9S (or T-9S) and heat treated above the solvus temperature of Ti-9S (or T-9S) remains within 10% deflection of its original bulge and roll curvature after about 75 strikes. In one embodiment, the faceplate 14 that is formed from Ti 6-4 and heat treated above the solvus temperature of Ti 6-4 remains within 13% deflection of its original roll curvature and within 10% deflection of its original bulge curvature after about 75 strikes.

In one embodiment, the faceplate 14 that is formed from Ti-9S (or T-9S) and heat treated above the solvus temperature of Ti-9S (or T-9S) remains within 10% deflection of its original bulge and roll curvature after about 100 strikes. In one embodiment, the faceplate 14 that is formed from Ti 6-4 and heat treated above the solvus temperature of Ti 6-4 remains within 14% deflection of its original roll curvature and within 10% deflection of its original bulge curvature after about 100 strikes.

In one embodiment, the faceplate 14 that is formed from Ti-9S (or T-9S) and heat treated above the solvus temperature of Ti-9S (or T-9S) remains within 10% deflection of its original bulge and roll curvature after about 150 strikes. In one embodiment, the faceplate 14 that is formed from Ti 6-4 and heat treated above the solvus temperature of Ti 6-4 remains within 15% deflection of its original roll curvature and within 11% deflection of its original bulge curvature after about 150 strikes.

In one embodiment, the faceplate 14 that is formed from Ti-9S (or T-9S) and heat treated above the solvus temperature of Ti-9S (or T-9S) remains within 10% deflection of its original bulge and roll curvature after about 300 strikes. In one embodiment, the faceplate 14 that is formed from Ti 6-4 and heat treated above the solvus temperature of Ti 6-4 remains within 15% deflection of its original roll and bulge curvature after about 300 strikes.

In one embodiment, the faceplate 14 that is formed from Ti-9S (or T-9S) and heat treated above the solvus temperature of Ti-9S (or T-9S) remains within 10% deflection of its original bulge and roll curvature after about 1,000 strikes. In one embodiment, the faceplate 14 that is formed from Ti 6-4 and heat treated above the solvus temperature of Ti 6-4 remains within 23% deflection of its original roll curvature and within 17% deflection of its original bulge curvature after about 1,000 strikes.

In one embodiment, the faceplate 14 that is formed from Ti-9S (or T-9S) and heat treated above the solvus temperature of Ti-9S (or T-9S) remains within 10% deflection of its original bulge and roll curvature after about 2,000 strikes. In one embodiment, the faceplate 14 that is formed from Ti 6-4 and heat treated above the solvus temperature of Ti 6-4 remains within 24% deflection of its original roll curvature and within 18% deflection of its original bulge curvature after about 2,000 strikes.

Figure 16:
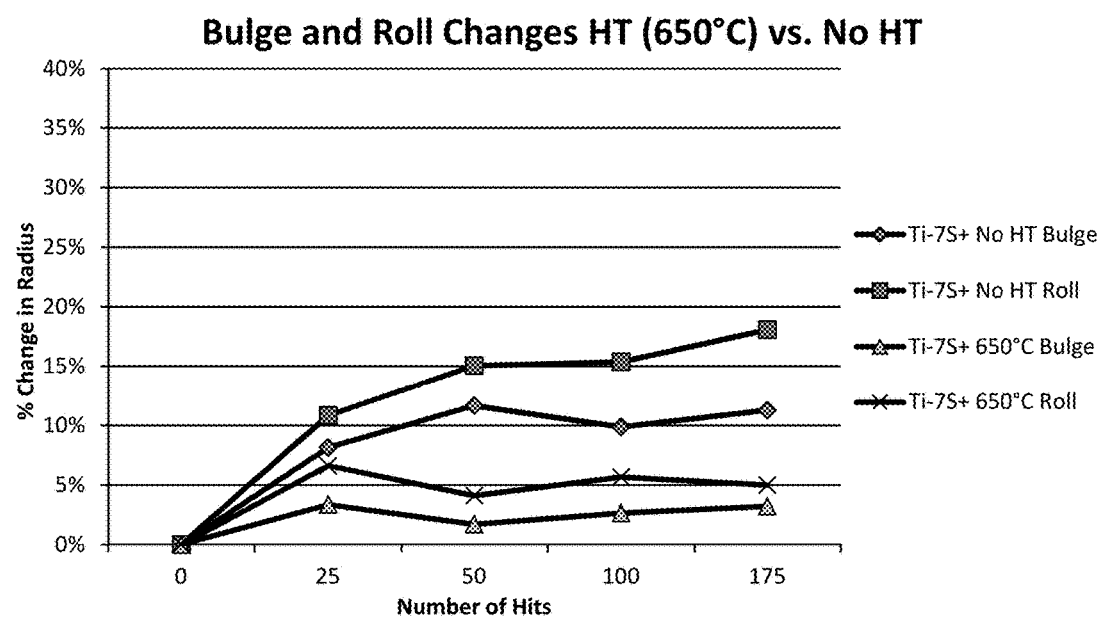
FIG. 16 is a chart showing experimental bulge and roll measurements for faceplates made of Ti-7S$^+$ alloys with and without heat treat at 650° C.

As shown in FIG. 16, an experiment was performed to compare the effect of various heat treatment temperatures on the faceplate 14 over the course of 2,000 hits or ball strikes. However, the data presented in FIG. 16 is limited to the first 175 hits or ball strikes wherein the majority of the changes take place. The data between 175 and 2,000 hits or ball strikes plateaus and follows a similar progression as the data displayed for 50 to 175 hits. The faceplates 14 were formed from Ti-7S$^+$ (or Ti-7S, T-7S, or ST721—hereafter Ti-7S$^+$) alloy. One club head assembly was not heat treated. A second club head assembly was heated to 650° C., which is above the solvus temperature of the Ti-7S$^+$ alloy. The measurement data provided in FIG. 16 represent the percent change in the radius of curvature of the bulge and the roll dimensions compared to the original radius curvature. As the faceplate becomes more flat, the radius of curvature increases. The club head assembly having a faceplate 14 with untreated Ti-7S$^+$ flattened significantly in both its roll and bulge dimensions within 50 hits on a golf ball. In contrast, the club head assembly having a Ti-7S$^+$ faceplate treated at 650° C. maintained its curvature significantly better than the first club head assembly after 2,000 hits. The main changes in roll and bulge dimensions occur within the first 50 to 100 hits, as seen in FIG. 16. The Ti-7S$^+$ faceplate treated at 650° C. maintained its curvature better in both roll and bulge dimensions after 2,000 hits than the first club head assembly having a faceplate 14 of untreated Ti-7S$^+$.

For heat treatments below the solvus temperature (for example, at 400° C.), Ti$_3$Al particles become more mobile and can precipitate into the α-matrix. Some of the Ti$_3$Al particles gather at grain boundaries and age harden the material. In contrast, for heat treatments above the solvus temperature (for example, at 650° C. or 700° C.), Ti$_3$Al particles instead dissolve within the α-matrix. The brittle Ti$_3$Al particles can act as points of stress. Dissolving brittle Ti$_3$Al particles within the α-matrix thereby acts as a stress relief. This "stress relief" process enables the club head assembly 30 to better withstand tensile and compressive forces during impact against a golf ball.

In one embodiment, the faceplate 14 that is formed from Ti-7S$^+$ and heat treated above the solvus temperature of Ti-7S$^+$ remains within ~7% deflection of its original roll curvature and within ~4% of its original bulge after about 25 strikes. In one embodiment, the faceplate 14 that is formed from untreated Ti-7S$^+$ remains within ~11% deflection of its original roll curvature and within ~8% deflection of its original bulge curvature after about 25 strikes.

In one embodiment, the faceplate 14 that is formed from Ti-7S$^+$ and heat treated above the solvus temperature of Ti-7S$^+$ remains within ~4% deflection of its original roll curvature and within ~2% of its original bulge after about 50 strikes. In one embodiment, the faceplate 14 that is formed from untreated Ti-7S$^+$ remains within ~15% deflection of its original roll curvature and within ~12% deflection of its original bulge curvature after about 50 strikes.

In one embodiment, the faceplate 14 that is formed from Ti-7S$^+$ and heat treated above the solvus temperature of Ti-7S$^+$ remains within ~6% deflection of its original roll curvature and within ~3% of its original bulge after about 100 strikes. In one embodiment, the faceplate 14 that is formed from untreated Ti-7S$^+$ remains within ~15% deflection of its original roll curvature and within ~10% deflection of its original bulge curvature after about 100 strikes.

In one embodiment, the faceplate 14 that is formed from Ti-7S$^+$ and heat treated above the solvus temperature of Ti-7S$^+$ remains within ~5% deflection of its original roll curvature and within ~3% of its original bulge after about 175 strikes. In one embodiment, the faceplate 14 that is formed from untreated Ti-7S$^+$ remains within ~18% deflection of its original roll curvature and within ~12% deflection of its original bulge curvature after about 175 strikes.

In one embodiment, the faceplate 14 that is formed from Ti-7S$^+$ and heat treated above the solvus temperature of Ti-7S$^+$ remains within 5% to 10% deflection of its original roll curvature and within 2% to 5% of its original bulge after any number of strikes between about 175 and 2,000 strikes. In one embodiment, the faceplate 14 that is formed from untreated Ti-7S$^+$ remains within 15% to 20% deflection of its original roll curvature and within 10% to 15% deflection of its original bulge curvature after any number of strikes between about 175 and 2,000 strikes.

Figure 17:
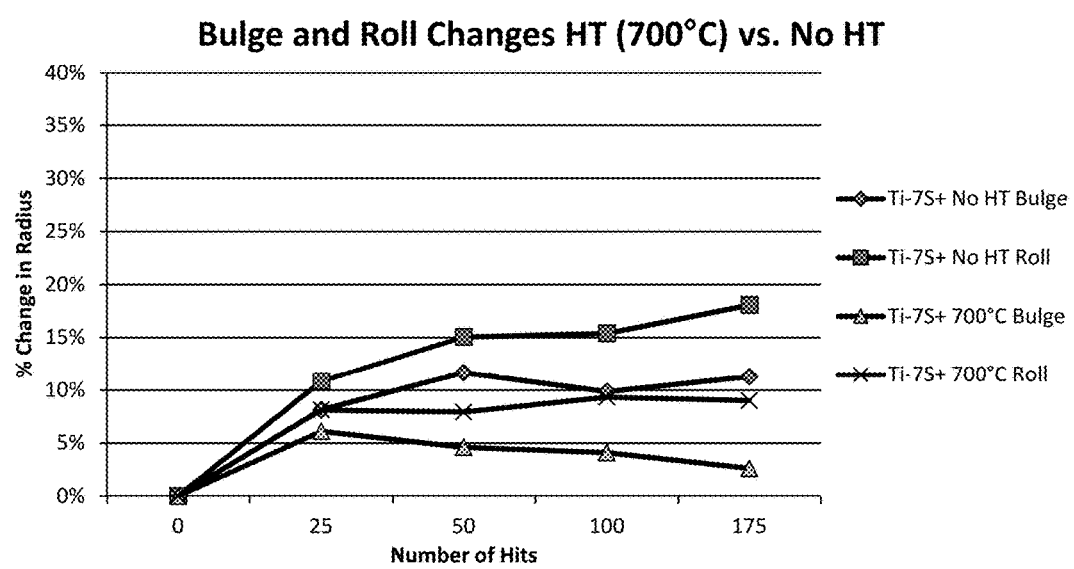
FIG. 17 is a chart showing experimental bulge and roll measurements for faceplates made of Ti-7S$^+$ alloys with and without heat treat at 700° C.

As shown in FIG. 17, an experiment was performed to compare the effect of various heat treatment temperatures on the faceplate 14 over the course of 2,000 hits or ball strikes. However, the data presented in FIG. 16 is limited to the first 175 hits or ball strikes wherein the majority of the changes take place. The data between 175 and 2,000 hits or ball strikes plateaus and follows a similar progression as the data displayed for 50 to 175 hits. The faceplates 14 were formed from Ti-7S$^+$ alloy. One club head assembly was not heat treated. A second club head assembly was heated to 700° C., which is above the solvus temperature of the Ti-7S$^+$ alloy. The measurement data provided in FIG. 16 represent the percent change in the radius of curvature of the bulge and the roll dimensions compared to the original radius curvature. As the faceplate becomes more flat, the radius of curvature increases. The club head assembly having a faceplate 14 with untreated Ti-7S$^+$ flattened significantly in both its roll and bulge dimensions within 50 hits on a golf ball. In contrast, the club head assembly having a Ti-7S$^+$ faceplate treated at 650° C. maintained its curvature significantly better than the first club head assembly after 2,000 hits. The main changes in roll and bulge dimensions occur within the first 50 to 100 hits, as seen in FIG. 16. The Ti-7S$^+$ faceplate treated at 700° C. maintained its curvature better in both roll and bulge dimensions after 2,000 hits than the first club head assembly having a faceplate 14 of untreated Ti-7S+.

In one embodiment, the faceplate 14 that is formed from Ti-7S+ and heat treated above the solvus temperature of Ti-7S+ remains within ~8% deflection of its original roll curvature and within ~6% of its original bulge after about 25 strikes. In one embodiment, the faceplate 14 that is formed from untreated Ti-7S+ remains within ~11% deflection of its original roll curvature and within ~8% deflection of its original bulge curvature after about 25 strikes.

In one embodiment, the faceplate 14 that is formed from Ti-7S+ and heat treated above the solvus temperature of Ti-7S+ remains within ~8% deflection of its original roll curvature and within ~4% of its original bulge after about 50 strikes. In one embodiment, the faceplate 14 that is formed from untreated Ti-7S+ remains within ~15% deflection of its original roll curvature and within ~12% deflection of its original bulge curvature after about 50 strikes.

In one embodiment, the faceplate 14 that is formed from Ti-7S+ and heat treated above the solvus temperature of Ti-7S+ remains within ~9% deflection of its original roll curvature and within ~4% of its original bulge after about 100 strikes. In one embodiment, the faceplate 14 that is formed from untreated Ti-7S+ remains within ~15% deflection of its original roll curvature and within ~10% deflection of its original bulge curvature after about 100 strikes.

In one embodiment, the faceplate 14 that is formed from Ti-7S+ and heat treated above the solvus temperature of Ti-7S+ remains within ~9% deflection of its original roll curvature and within ~3% of its original bulge after about 175 strikes. In one embodiment, the faceplate 14 that is formed from untreated Ti-7S+ remains within ~18% deflection of its original roll curvature and within ~12% deflection of its original bulge curvature after about 175 strikes.

In one embodiment, the faceplate 14 that is formed from Ti-7S+ and heat treated above the solvus temperature of Ti-7S+ remains within 5% to 10% deflection of its original roll curvature and within 2% to 6% of its original bulge after any number of strikes between about 175 and 2,000 strikes. In one embodiment, the faceplate 14 that is formed from untreated Ti-7S+ remains within 15% to 20% deflection of its original roll curvature and within 10% to 15% deflection of its original bulge curvature after any number of strikes between about 175 and 2,000 strikes.

The measurement data provided in Table 1, shown below, represents the percent changes in the radius of curvature of the bulge and roll dimensions compared to the original radius of curvature for the embodiments tracked in FIGS. 16 and 17.

TABLE 1

Raw data for the percentage deflection of the roll and bulge on Ti-7S+ alloys with and without heat treatment at various temperatures.

| Hits | Ti-7S+ No HT Roll | Ti-7S+ No HT Bulge | Ti-7S+ 650° C. Roll | Ti-7S+ 650° C. Bulge | Ti-7S+ 700° C. Roll | Ti-7S+ 700° C. Bulge |
|---|---|---|---|---|---|---|
| 0 | 0% | 0% | 0% | 0% | 0% | 0% |
| 25 | 11% | 8% | 7% | 4% | 8% | 6% |
| 50 | 15% | 12% | 4% | 2% | 8% | 4% |
| 100 | 15% | 10% | 6% | 3% | 9% | 4% |
| 175 | 18% | 12% | 5% | 3% | 9% | 3% |

Furthermore, an experiment was performed to compare the effect of various heat treatment temperatures on the faceplate 14 over the course of 2,000 hits or ball strikes. The faceplate 14 was formed from α-β Ti alloy. One club head assembly was heated to 400° C., which is below the solvus temperature of the α-β Ti alloy. A second club head assembly was heated to 600° C., which is above the solvus temperature of the α-β Ti alloy. The club head assembly treated at 400° C. flattened significantly in both its roll and bulge dimensions within 25 hits on a golf ball. In contrast, the club head assembly treated at 600° C. did not begin to flatten until 225 strikes on a golf ball and maintained its curvature significantly better than the first club head assembly after 2,000 hits.

In one embodiment, the club head assembly treated at 500° C. maintained its original bulge and roll curvature after 25 hits. In one embodiment, the club head assembly treated at 500° C. maintained its original bulge and roll curvature after 50 hits. In one embodiment, the club head assembly treated at 500° C. maintained its original bulge and roll curvature after 75 hits. In one embodiment, the club head assembly treated at 500° C. maintained its original bulge and roll curvature after 100 hits. In one embodiment, the club head assembly treated at 500° C. maintained its original bulge and roll curvature after 125 hits. In one embodiment, the club head assembly treated at 500° C. maintained its original bulge and roll curvature after 150 hits. In one embodiment, the club head assembly treated at 500° C. maintained its original bulge and roll curvature after 175 hits. In one embodiment, the club head assembly treated at 500° C. maintained its original bulge and roll curvature after 200 hits. In one embodiment, the club head assembly treated at 500° C. maintained its original bulge and roll curvature after 225 hits.

In one embodiment, the club head assembly treated at 500° C. substantially maintained its bulge and roll curvature after 250 hits. In one embodiment, the club head assembly treated at 500° C. substantially maintained its bulge and roll curvature after 275 hits. In one embodiment, the club head assembly treated at 500° C. substantially maintained its bulge and roll curvature after 300 hits. In one embodiment, the club head assembly treated at 500° C. substantially maintained its bulge and roll curvature after 500 hits. In one embodiment, the club head assembly treated at 500° C. substantially maintained its bulge and roll curvature after 1,000 hits. In one embodiment, the club head assembly treated at 500° C. substantially maintained its bulge and roll curvature after 1500 hits. In one embodiment, the club head assembly treated at 500° C. substantially maintained its bulge and roll curvature after 2,000 hits.

In one embodiment, the club head assembly treated at 600° C. maintained its original bulge and roll curvature after 25 hits. In one embodiment, the club head assembly treated at 600° C. maintained its original bulge and roll curvature after 50 hits. In one embodiment, the club head assembly treated at 600° C. maintained its original bulge and roll curvature after 75 hits. In one embodiment, the club head assembly treated at 600° C. maintained its original bulge and roll curvature after 100 hits. In one embodiment, the club head assembly treated at 600° C. maintained its original bulge and roll curvature after 125 hits. In one embodiment, the club head assembly treated at 600° C. maintained its original bulge and roll curvature after 150 hits. In one embodiment, the club head assembly treated at 600° C. maintained its original bulge and roll curvature after 175 hits. In one embodiment, the club head assembly treated at 600° C. maintained its original bulge and roll curvature after 200 hits. In one embodiment, the club head assembly treated at 600° C. maintained its original bulge and roll curvature after 225 hits.

In one embodiment, the club head assembly treated at 600° C. substantially maintained its bulge and roll curvature after 250 hits. In one embodiment, the club head assembly treated at 600° C. substantially maintained its bulge and roll curvature after 275 hits. In one embodiment, the club head assembly treated at 600° C. substantially maintained its bulge and roll curvature after 300 hits. In one embodiment, the club head assembly treated at 600° C. substantially maintained its bulge and roll curvature after 500 hits. In one embodiment, the club head assembly treated at 600° C. substantially maintained its bulge and roll curvature after 1,000 hits. In one embodiment, the club head assembly treated at 600° C. substantially maintained its bulge and roll curvature after 1500 hits. In one embodiment, the club head assembly treated at 600° C. substantially maintained its bulge and roll curvature after 2,000 hits.

In one embodiment, the club head assembly treated at 600° C. maintained its original bulge curvature and its roll curvature radius increased from 11 inches to 13 inches after 250 hits. In one embodiment, the club head assembly treated at 600° C. maintained its original bulge curvature and maintained a roll curvature radius of 13 inches after 275 hits. In one embodiment, the club head assembly treated at 600° C. increased its bulge curvature radius from 12 inches to 13 inches and maintained a roll curvature radius of 13 inches after 300 hits. In one embodiment, the club head assembly treated at 600° C. maintained its bulge curvature radius of 13 inches and maintained a roll curvature radius of 13 inches after 500 hits. In one embodiment, the club head assembly treated at 600° C. maintained its bulge curvature radius of 13 inches and increased its roll curvature radius from 13 inches to 14 inches after 1,000 hits. In one embodiment, the club head assembly treated at 600° C. maintained its bulge curvature radius of 13 inches and maintained a roll curvature radius of 14 inches after 1,500 hits. In one embodiment, the club head assembly treated at 600° C. maintained its bulge curvature radius of 13 inches and maintained a roll curvature radius of 14 inches after 2,000 hits.

In one embodiment, the club head assembly treated at 700° C. maintained its original bulge and roll curvature after 25 hits. In one embodiment, the club head assembly treated at 700° C. maintained its original bulge and roll curvature after 50 hits. In one embodiment, the club head assembly treated at 700° C. maintained its original bulge and roll curvature after 75 hits. In one embodiment, the club head assembly treated at 700° C. maintained its original bulge and roll curvature after 100 hits. In one embodiment, the club head assembly treated at 700° C. maintained its original bulge and roll curvature after 125 hits. In one embodiment, the club head assembly treated at 700° C. maintained its original bulge and roll curvature after 150 hits. In one embodiment, the club head assembly treated at 700° C. maintained its original bulge and roll curvature after 175 hits. In one embodiment, the club head assembly treated at 700° C. maintained its original bulge and roll curvature after 200 hits. In one embodiment, the club head assembly treated at 700° C. maintained its original bulge and roll curvature after 225 hits.

In one embodiment, the club head assembly treated at 700° C. substantially maintained its bulge and roll curvature after 250 hits. In one embodiment, the club head assembly treated at 700° C. substantially maintained its bulge and roll curvature after 275 hits. In one embodiment, the club head assembly treated at 700° C. substantially maintained its bulge and roll curvature after 300 hits. In one embodiment, the club head assembly treated at 700° C. substantially maintained its bulge and roll curvature after 500 hits. In one embodiment, the club head assembly treated at 700° C. substantially maintained its bulge and roll curvature after 1,000 hits. In one embodiment, the club head assembly treated at 700° C. substantially maintained its bulge and roll curvature after 1500 hits. In one embodiment, the club head assembly treated at 700° C. substantially maintained its bulge and roll curvature after 2,000 hits.

In one embodiment, the club head assembly treated at 800° C. maintained its original bulge and roll curvature after 25 hits. In one embodiment, the club head assembly treated at 800° C. maintained its original bulge and roll curvature after 50 hits. In one embodiment, the club head assembly treated at 800° C. maintained its original bulge and roll curvature after 75 hits. In one embodiment, the club head assembly treated at 800° C. maintained its original bulge and roll curvature after 100 hits. In one embodiment, the club head assembly treated at 800° C. maintained its original bulge and roll curvature after 125 hits. In one embodiment, the club head assembly treated at 800° C. maintained its original bulge and roll curvature after 150 hits. In one embodiment, the club head assembly treated at 800° C. maintained its original bulge and roll curvature after 175 hits. In one embodiment, the club head assembly treated at 800° C. maintained its original bulge and roll curvature after 200 hits. In one embodiment, the club head assembly treated at 800° C. maintained its original bulge and roll curvature after 225 hits.

In one embodiment, the club head assembly treated at 800° C. substantially maintained its bulge and roll curvature after 250 hits. In one embodiment, the club head assembly treated at 800° C. substantially maintained its bulge and roll curvature after 275 hits. In one embodiment, the club head assembly treated at 800° C. substantially maintained its bulge and roll curvature after 300 hits. In one embodiment, the club head assembly treated at 800° C. substantially maintained its bulge and roll curvature after 500 hits. In one embodiment, the club head assembly treated at 800° C. substantially maintained its bulge and roll curvature after 1,000 hits. In one embodiment, the club head assembly treated at 800° C. substantially maintained its bulge and roll curvature after 1500 hits. In one embodiment, the club head assembly treated at 800° C. substantially maintained its bulge and roll curvature after 2,000 hits.

In one embodiment, the club head assembly treated at 900° C. maintained its original bulge and roll curvature after 25 hits. In one embodiment, the club head assembly treated at 900° C. maintained its original bulge and roll curvature after 50 hits. In one embodiment, the club head assembly treated at 900° C. maintained its original bulge and roll curvature after 75 hits. In one embodiment, the club head assembly treated at 900° C. maintained its original bulge and roll curvature after 100 hits. In one embodiment, the club head assembly treated at 900° C. maintained its original bulge and roll curvature after 125 hits. In one embodiment, the club head assembly treated at 900° C. maintained its original bulge and roll curvature after 150 hits. In one embodiment, the club head assembly treated at 900° C. maintained its original bulge and roll curvature after 175 hits. In one embodiment, the club head assembly treated at 900° C. maintained its original bulge and roll curvature after 200 hits. In one embodiment, the club head assembly treated at 900° C. maintained its original bulge and roll curvature after 225 hits.

In one embodiment, the club head assembly treated at 900° C. substantially maintained its bulge and roll curvature after 250 hits. In one embodiment, the club head assembly treated at 900° C. substantially maintained its bulge and roll curvature after 275 hits. In one embodiment, the club head assembly treated at 900° C. substantially maintained its bulge and roll curvature after 300 hits. In one embodiment, the club head assembly treated at 900° C. substantially maintained its bulge and roll curvature after 500 hits. In one embodiment, the club head assembly treated at 900° C. substantially maintained its bulge and roll curvature after 1,000 hits. In one embodiment, the club head assembly treated at 900° C. substantially maintained its bulge and roll curvature after 1500 hits. In one embodiment, the club head assembly treated at 900° C. substantially maintained its bulge and roll curvature after 2,000 hits.

In one embodiment, the club head assembly treated at 1000° C. maintained its original bulge and roll curvature after 25 hits. In one embodiment, the club head assembly treated at 1000° C. maintained its original bulge and roll curvature after 50 hits. In one embodiment, the club head assembly treated at 1000° C. maintained its original bulge and roll curvature after 75 hits. In one embodiment, the club head assembly treated at 1000° C. maintained its original bulge and roll curvature after 100 hits. In one embodiment, the club head assembly treated at 1000° C. maintained its original bulge and roll curvature after 125 hits. In one embodiment, the club head assembly treated at 1000° C. maintained its original bulge and roll curvature after 150 hits. In one embodiment, the club head assembly treated at 1000° C. maintained its original bulge and roll curvature after 175 hits. In one embodiment, the club head assembly treated at 1000° C. maintained its original bulge and roll curvature after 200 hits. In one embodiment, the club head assembly treated at 1000° C. maintained its original bulge and roll curvature after 225 hits.

In one embodiment, the club head assembly treated at 1000° C. substantially maintained its bulge and roll curvature after 250 hits. In one embodiment, the club head assembly treated at 1000° C. substantially maintained its bulge and roll curvature after 275 hits. In one embodiment, the club head assembly treated at 1000° C. substantially maintained its bulge and roll curvature after 300 hits. In one embodiment, the club head assembly treated at 1000° C. substantially maintained its bulge and roll curvature after 500 hits. In one embodiment, the club head assembly treated at 1000° C. substantially maintained its bulge and roll curvature after 1,000 hits. In one embodiment, the club head assembly treated at 1000° C. substantially maintained its bulge and roll curvature after 1500 hits. In one embodiment, the club head assembly treated at 1000° C. substantially maintained its bulge and roll curvature after 2,000 hits.

In one embodiment, the club head assembly treated at 1100° C. maintained its original bulge and roll curvature after 25 hits. In one embodiment, the club head assembly treated at 1100° C. maintained its original bulge and roll curvature after 50 hits. In one embodiment, the club head assembly treated at 1100° C. maintained its original bulge and roll curvature after 75 hits. In one embodiment, the club head assembly treated at 1100° C. maintained its original bulge and roll curvature after 100 hits. In one embodiment, the club head assembly treated at 1100° C. maintained its original bulge and roll curvature after 125 hits. In one embodiment, the club head assembly treated at 1100° C. maintained its original bulge and roll curvature after 150 hits. In one embodiment, the club head assembly treated at 1100° C. maintained its original bulge and roll curvature after 175 hits. In one embodiment, the club head assembly treated at 1100° C. maintained its original bulge and roll curvature after 200 hits. In one embodiment, the club head assembly treated at 1100° C. maintained its original bulge and roll curvature after 225 hits.

In one embodiment, the club head assembly treated at 1100° C. substantially maintained its bulge and roll curvature after 250 hits. In one embodiment, the club head assembly treated at 1100° C. substantially maintained its bulge and roll curvature after 275 hits. In one embodiment, the club head assembly treated at 1100° C. substantially maintained its bulge and roll curvature after 300 hits. In one embodiment, the club head assembly treated at 1100° C. substantially maintained its bulge and roll curvature after 500 hits. In one embodiment, the club head assembly treated at 1100° C. substantially maintained its bulge and roll curvature after 1,000 hits. In one embodiment, the club head assembly treated at 1100° C. substantially maintained its bulge and roll curvature after 1500 hits. In one embodiment, the club head assembly treated at 1100° C. substantially maintained its bulge and roll curvature after 2,000 hits.

In one embodiment, the club head assembly treated at 1200° C. maintained its original bulge and roll curvature after 25 hits. In one embodiment, the club head assembly treated at 1200° C. maintained its original bulge and roll curvature after 50 hits. In one embodiment, the club head assembly treated at 1200° C. maintained its original bulge and roll curvature after 75 hits. In one embodiment, the club head assembly treated at 1200° C. maintained its original bulge and roll curvature after 100 hits. In one embodiment, the club head assembly treated at 1200° C. maintained its original bulge and roll curvature after 125 hits. In one embodiment, the club head assembly treated at 1200° C. maintained its original bulge and roll curvature after 150 hits. In one embodiment, the club head assembly treated at 1200° C. maintained its original bulge and roll curvature after 175 hits. In one embodiment, the club head assembly treated at 1200° C. maintained its original bulge and roll curvature after 200 hits. In one embodiment, the club head assembly treated at 1200° C. maintained its original bulge and roll curvature after 225 hits.

In one embodiment, the club head assembly treated at 1200° C. substantially maintained its bulge and roll curvature after 250 hits. In one embodiment, the club head assembly treated at 1200° C. substantially maintained its bulge and roll curvature after 275 hits. In one embodiment, the club head assembly treated at 1200° C. substantially maintained its bulge and roll curvature after 300 hits. In one embodiment, the club head assembly treated at 1200° C. substantially maintained its bulge and roll curvature after 500 hits. In one embodiment, the club head assembly treated at 1200° C. substantially maintained its bulge and roll curvature after 1,000 hits. In one embodiment, the club head assembly treated at 1200° C. substantially maintained its bulge and roll curvature after 1500 hits. In one embodiment, the club head assembly treated at 1200° C. substantially maintained its bulge and roll curvature after 2,000 hits.

In one embodiment, the club head assembly treated at or above the solvus temperature maintained its original bulge and roll curvature after 25 hits. In one embodiment, the club head assembly treated at or above the solvus temperature maintained its original bulge and roll curvature after 50 hits. In one embodiment, the club head assembly treated at or above the solvus temperature maintained its original bulge and roll curvature after 75 hits. In one embodiment, the club head assembly treated at or above the solvus temperature maintained its original bulge and roll curvature after 100 hits. In one embodiment, the club head assembly treated at or above the solvus temperature maintained its original bulge and roll curvature after 125 hits. In one embodiment, the club head assembly treated at or above the solvus temperature maintained its original bulge and roll curvature after 150 hits. In one embodiment, the club head assembly treated at or above the solvus temperature maintained its original bulge and roll curvature after 175 hits. In one embodiment, the club head assembly treated at or above the solvus temperature maintained its original bulge and roll curvature after 200 hits. In one embodiment, the club head assembly treated at or above the solvus temperature maintained its original bulge and roll curvature after 225 hits.

In one embodiment, the club head assembly treated at or above the solvus temperature substantially maintained its bulge and roll curvature after 250 hits. In one embodiment, the club head assembly treated at or above the solvus temperature substantially maintained its bulge and roll curvature after 275 hits. In one embodiment, the club head assembly treated at or above the solvus temperature substantially maintained its bulge and roll curvature after 300 hits. In one embodiment, the club head assembly treated at or above the solvus temperature substantially maintained its bulge and roll curvature after 500 hits. In one embodiment, the club head assembly treated at or above the solvus temperature substantially maintained its bulge and roll curvature after 1,000 hits. In one embodiment, the club head assembly treated at or above the solvus temperature substantially maintained its bulge and roll curvature after 1500 hits. In one embodiment, the club head assembly treated at or above the solvus temperature substantially maintained its bulge and roll curvature after 2,000 hits.

Figure 8:
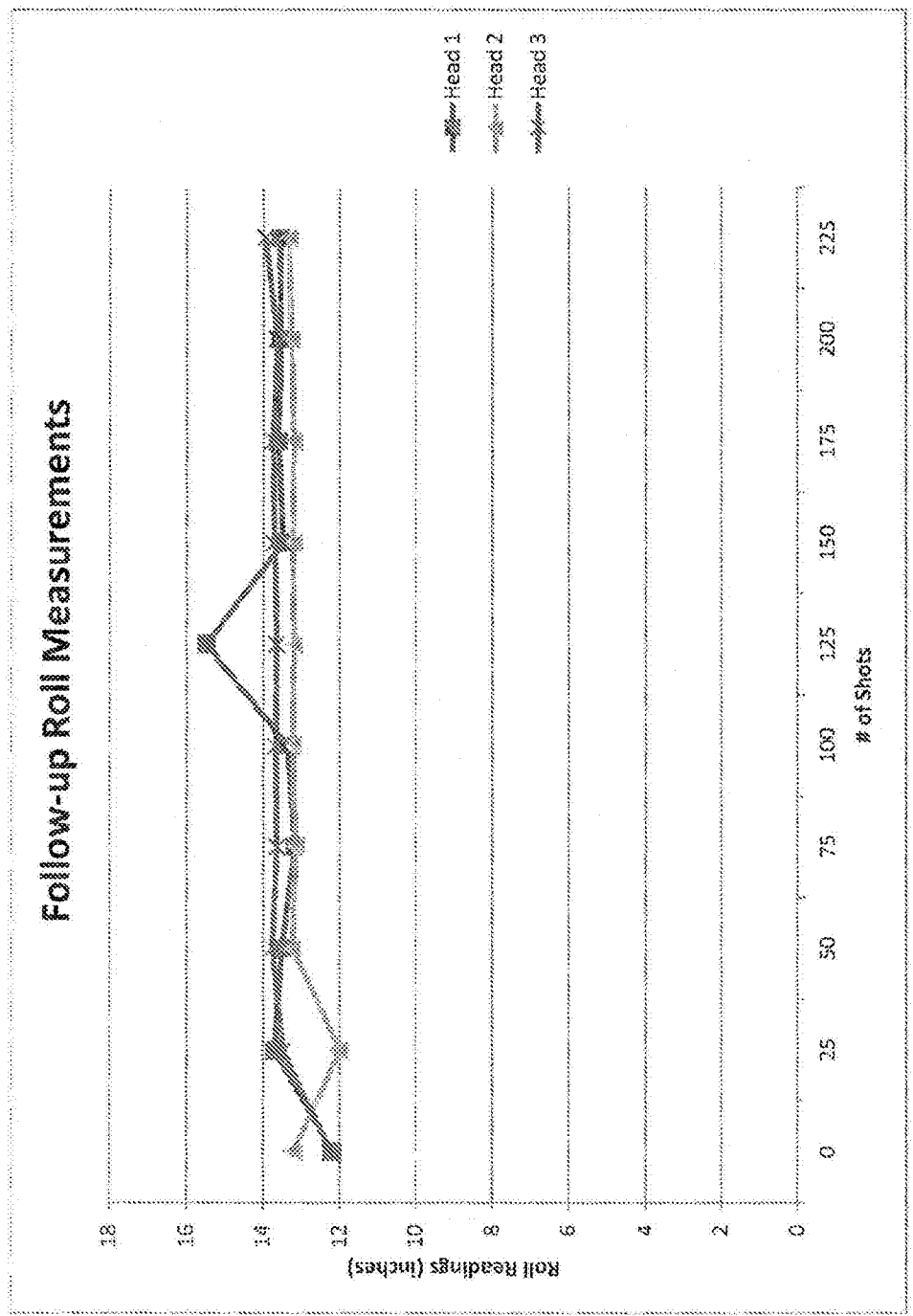
FIG. 8 is a chart showing experimental roll measurements for faceplates having various geometries.

Also, as shown in FIG. 8, a follow-up experiment was performed to compare the impact of a 600° C. heat treatment on three different faceplate geometries. The roll measurements for all three faceplate geometries were consistent, confirming that the stress-relief heat treatment increases the faceplate's ability to maintain its curvature. The faceplate comprised the Ti-9S (or T-9S) alloy.

Figure 9:
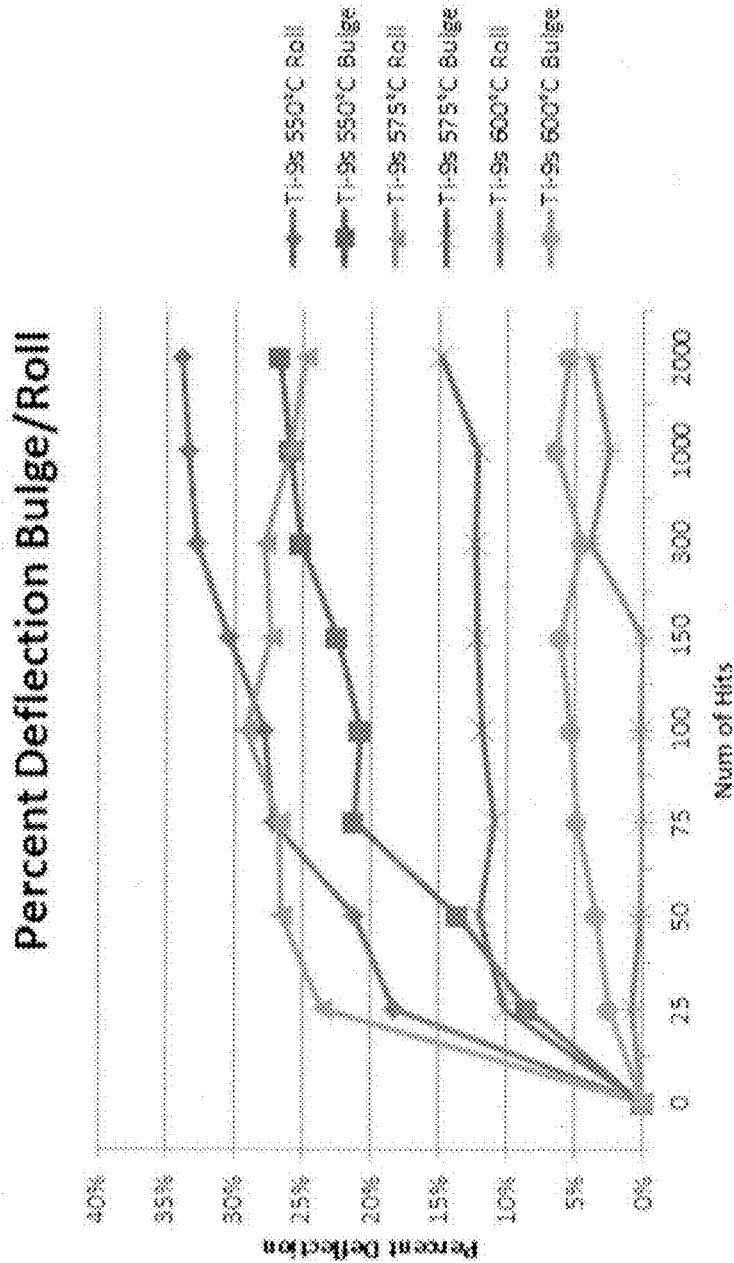
FIG. 9 is a chart showing experimental bulge and roll measurements for faceplates that are subjected to various heat-treatment processes.

Referring now to FIG. 9, an experiment was performed to compare the effect of various heat treatment temperatures on the faceplate 14 over the course of 2,000 hits or ball strikes. The faceplates 14 were formed from Ti-9S (or T-9S) alloy. One club head assembly was heated to 550° C., which is below the solvus temperature of the Ti-9S (or T-9S) alloy. A second club head assembly was heated to 575° C. and a third club head was heated to 600° C., which is above the solvus temperature of the Ti-9S (or T-9S) alloy. The measurement data provided in FIG. 9 represent the percentage change in the radius of curvature of the bulge and the roll dimensions compared to the original radius curvature. As the faceplate becomes more flat, the radius of curvature increases. The club head assembly treated at 550° C. flattened significantly in both its roll and bulge dimensions within a few hits on a golf ball. In contrast, the club head assembly treated at 600° C. maintained its curvature significantly better than the club head assemblies after 2,000 hits.

In one embodiment, the faceplate 14 formed from Ti-9S (or T-9S) and heat treated at 600° C. remains within 1% deflection of its original roll curvature and within 3% deflection of its original bulge curvature after 25 strikes. In one embodiment, the faceplate 14 formed from Ti-9S (or T-9S) and heat treated at 575° C. remains within 24% deflection of its original roll curvature and within 11% deflection of its original bulge curvature after 25 strikes. In one embodiment, the faceplate 14 formed from Ti-9S (or T-9S) and heat treated at 550° C. remains within 19% deflection of its original roll curvature and within 9% deflection of its original bulge curvature after 25 strikes.

In one embodiment, the faceplate 14 formed from Ti-9S (or T-9S) and heat treated at 600° C. retains its original roll curvature and is within 4% deflection of its original bulge curvature after 50 strikes. In one embodiment, the faceplate 14 formed from Ti-9S (or T-9S) and heat treated at 575° C. remains within 28% deflection of its original roll curvature and within 13% deflection of its original bulge curvature after 50 strikes. In one embodiment, the faceplate 14 formed from Ti-9S (or T-9S) and heat treated at 550° C. remains within 23% deflection of its original roll curvature and within 15% deflection of its original bulge curvature after 50 strikes.

In one embodiment, the faceplate 14 formed from Ti-9S (or T-9S) and heat treated at 600° C. retains its original roll curvature and is within 5% deflection of its original bulge curvature after 75 strikes. In one embodiment, the faceplate 14 formed from Ti-9S (or T-9S) and heat treated at 575° C. remains within 28% deflection of its original roll curvature and within 12% deflection of its original bulge curvature after 75 strikes. In one embodiment, the faceplate 14 formed from Ti-9S (or T-9S) and heat treated at 550° C. remains within 28% deflection of its original roll curvature and within 23% deflection of its original bulge curvature after 75 strikes.

In one embodiment, the faceplate 14 formed from Ti-9S (or T-9S) and heat treated at 600° C. retains its original roll curvature and is within 6% deflection of its original bulge curvature after 100 strikes. In one embodiment, the faceplate 14 formed from Ti-9S (or T-9S) and heat treated at 575° C. remains within 30% deflection of its original roll curvature and within 13% deflection of its original bulge curvature after 100 strikes. In one embodiment, the faceplate 14 formed from Ti-9S (or T-9S) and heat treated at 550° C. remains within 29% deflection of its original roll curvature and within 22% deflection of its original bulge curvature after 100 strikes.

In one embodiment, the faceplate 14 formed from Ti-9S (or T-9S) and heat treated at 600° C. retains its original roll curvature and is within 7% deflection of its original bulge curvature after 150 strikes. In one embodiment, the faceplate 14 formed from Ti-9S (or T-9S) and heat treated at 575° C. remains within 28% deflection of its original roll curvature and within 13% deflection of its original bulge curvature after 150 strikes. In one embodiment, the faceplate 14 formed from Ti-9S (or T-9S) and heat treated at 550° C. remains within 31% deflection of its original roll curvature and within 24% deflection of its original bulge curvature after 150 strikes.

In one embodiment, the faceplate 14 formed from Ti-9S (or T-9S) and heat treated at 600° C. remains within 5% deflection of its original roll curvature and within 5% deflection of its original bulge curvature after 300 strikes. In one embodiment, the faceplate 14 formed from Ti-9S (or T-9S) and heat treated at 575° C. remains within 28% deflection of its original roll curvature and within 14% deflection of its original bulge curvature after 300 strikes. In one embodiment, the faceplate 14 formed from Ti-9S (or T-9S) and heat treated at 550° C. remains within 34% deflection of its original roll curvature and within 26% deflection of its original bulge curvature after 300 strikes.

In one embodiment, the faceplate 14 formed from Ti-9S (or T-9S) and heat treated at 600° C. remains within 4% deflection of its original roll curvature and within 7% deflection of its original bulge curvature after 1,000 strikes. In one embodiment, the faceplate 14 formed from Ti-9S (or T-9S) and heat treated at 575° C. remains within 27% deflection of its original roll curvature and within 13% deflection of its original bulge curvature after 1,000 strikes. In one embodiment, the faceplate 14 formed from Ti-9S (or T-9S) and heat treated at 550° C. remains within 34% deflection of its original roll curvature and within 27% deflection of its original bulge curvature after 1,000 strikes.

In one embodiment, the faceplate 14 formed from Ti-9S (or T-9S) and heat treated at 600° C. remains within 5% deflection of its original roll curvature and within 6% deflection of its original bulge curvature after 2,000 strikes. In one embodiment, the faceplate 14 formed from Ti-9S (or T-9S) and heat treated at 575° C. remains within 25% deflection of its original roll curvature and within 15% deflection of its original bulge curvature after 2,000 strikes. In one embodiment, the faceplate 14 formed from Ti-9S (or T-9S) and heat treated at 550° C. remains within 34% deflection of its original roll curvature and within 28% deflection of its original bulge curvature after 2,000 strikes.

Figure 10:
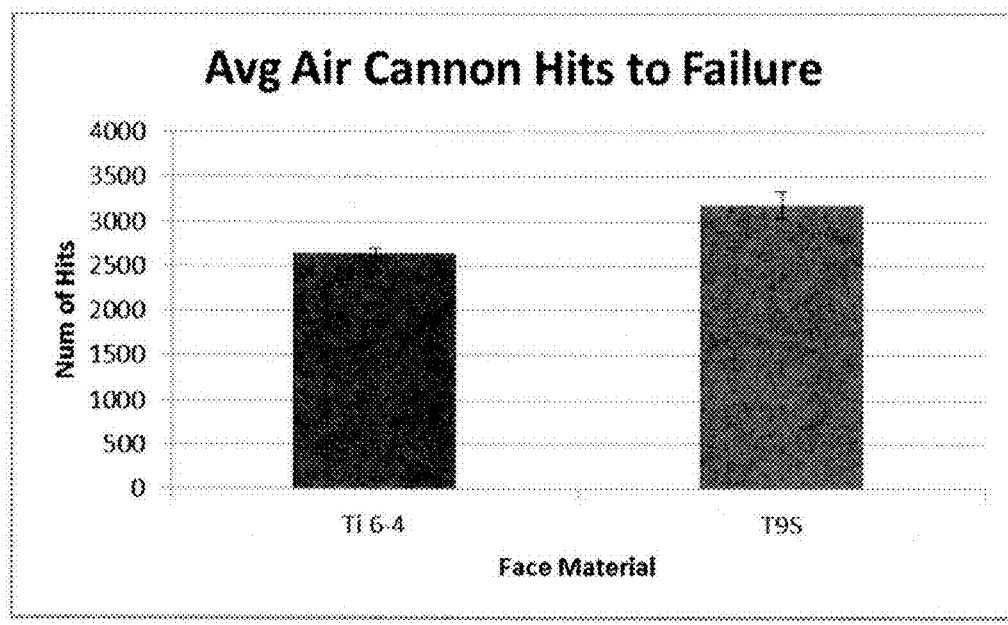
FIG. 10 is a chart showing durability measurements for faceplates having various material compositions.

As shown in FIG. 10, an experiment was performed to compare the durability of faceplate 14 when composed of either the Ti-6-4 alloy or the Ti-9S (T-9S) alloy. The experiment tracked the number of strikes from an air cannon until failure of the faceplate 14. One club head assembly used Ti 6-4 alloy as the faceplate material. A second club head assembly used a different model club head with Ti 6-4 alloy as the faceplate material (data not shown). A third club head assembly used a third model club head with the Ti 6-4 alloy as the faceplate material (data not shown). A fourth club head assembly uses the same model club head as the third club head assembly, with Ti-9S (or T-9S) alloy as the faceplate material. The measurement data provided in FIG. 10 represents the number of hits until failure of the faceplate. The club head assembly with the T-9S (or Ti-9S) alloy faceplate showed increased durability over assemblies with Ti 6-4 alloy faceplates. The same club head model showed an increased durability of about 3200 hits until failure of the faceplate with T-9S (or Ti-9S) alloy as the faceplate material, as opposed to a durability of 2600 hits until failure with Ti 6-4 alloy as the faceplate material.

Table 2, shown below, quantifies the composition of Ti-6Al-4V (or Ti 6-4), Ti-7$^+$ (or Ti-7S, T-7S, or ST721), Ti-9S (or T-9S), and Ti-8-1-1 alloys. Table 3, shown below, is a chart showing the mechanical properties of various $\alpha$-$\beta$ Ti alloys. This data is based on METL reports and verified with industry standards and supplier data sheets. Table 4 is a chart showing the projected weight savings based on one embodiment. Due to the strength of the Ti-7S$^+$ alloy, a Ti-7S$^+$ face may have a thickness of approximately 10% thinner or approximately 15% thinner than the Ti 6-4 alloy. This reduced thickness of the face can result in significant weight savings.

TABLE 2

Chart showing the compositions of Ti-7S$^+$, T-9S, Ti 6-4, and Ti-8-1-1.

|  | C | Si | Mo | Fe | Al | V | Sn | O | N | Ti |
|---|---|---|---|---|---|---|---|---|---|---|
| 7s+ | 0.05 max | 0.25 max | 2-3 | 0.5-1.5 | 7-8 | 0.5-1.5 | trace | 0.20 max | 0.04 max | balance |
| 9s | 0.08 max | 0.20 max | trace | 0.30 max | 6.50-8.50 | 1.00-2.00 | trace | 0.20 max | trace | balance |
| 6-4 | 0.08 max | 0.03 max | trace | 0.30 max | 5.50-6.75 | 3.50-4.50 | 0.015 max | 0.20 max | trace | balance |
| 8-1-1 | 0.08 max | trace | 0.75-1.25 | 0.30 max | 7.50-8.50 | 0.75-1.25 | 0.015 max | 0.12 max | trace | balance |

TABLE 3

Chart showing the mechanical properties of various $\alpha$-$\beta$ Ti alloys.

|  | T9S Sheet * (transverse) | T9S Sheet * (longitudinal) | Ti-7S$^+$ Sheet | Ti 6-4 Cast | Ti 6-4 Sheet | Ti 8-1-1 Cast | Ti 8-1-1 Sheet | 17-4 Sheet Cond A |
|---|---|---|---|---|---|---|---|---|
| Yield (ksi) | 135-145 | 135-145 | 165-185 | 115-125 | 125-135 | 110-120 | 115-125 | 130-140 |
| Tensile (ksi) | 145-155 | 155-165 | 185-195 | 125-135 | 130-140 | 125-135 | 125-135 | 150-160 |
| Elongation (%) | 7-12 | 14-19 | 8.5% | 13-18 | 12-15 | 7-12 | 8-10 | 4-6 |
| Young's Modulus (Mpsi) | 15.9 | 15.2 | 13.9 | 16.2 | 16.5 | 18.0 | 17.5 | 28.5 |

* Samples had driver heat treat (600° C. for 1 hour)

TABLE 4

Chart showing the projected weight savings based on selected embodiments.

|  | Outer Face Thickness | Center Face Thickness | Density | | Face Volume | Face Mass | Wt Savings Over Ti 6-4 | Body Volume | Body Mass |
|---|---|---|---|---|---|---|---|---|---|
|  | (inches) | (inches) | (lb/in$^3$) | (g/in$^3$) | (in$^3$) | (grams) | (grams) | (in$^3$) | (grams) |
| Ti 6-4 (current) | 0.090 | 0.140 | 0.1597 | 72.44 | 0.592 | 42.9 | — | 1.9013 | 137.7 |

TABLE 4-continued

Chart showing the projected weight savings based on selected embodiments.

| | Outer Face Thickness | Center Face Thickness | Density | | Face Volume | Face Mass | Wt Savings Over Ti 6-4 | Body Volume | Body Mass |
|---|---|---|---|---|---|---|---|---|---|
| | (inches) | (inches) | (lb/in³) | (g/in³) | (in³) | (grams) | (grams) | (in³) | (grams) |
| Ti 8-1-1 | 0.090 | 0.140 | 0.1575 | 71.44 | 0.592 | 42.3 | 0.6 | 1.9013 | 135.8 |
| T9S | 0.090 | 0.140 | 0.1560 | 70.76 | 0.592 | 41.9 | 1.0 | 1.9013 | 134.5 |
| T9S @ 5% thinner | 0.086 | 0.136 | 0.1560 | 70.76 | 0.563 | 39.8 | 3.1 | 1.9013 | 134.5 |
| T9S @ 10% thinner | 0.081 | 0.131 | 0.1560 | 70.76 | 0.533 | 37.7 | 5.2 | 1.9013 | 134.5 |
| Ti-7S+ | 0.090 | 0.140 | 0.1614 | 73.25 | 0.592 | 43.4 | −0.5 | 1.9013 | 139.3 |
| Ti-7S+ @ 10% Thinner | 0.081 | 0.131 | 0.1614 | 73.25 | 0.533 | 39.0 | 3.9 | 1.9013 | 139.3 |
| Ti-7S+ @ 15% Thinner | 0.076 | 0.126 | 0.1614 | 73.25 | 0.502 | 36.8 | 6.1 | 1.9013 | 139.3 |

Figure 11A:
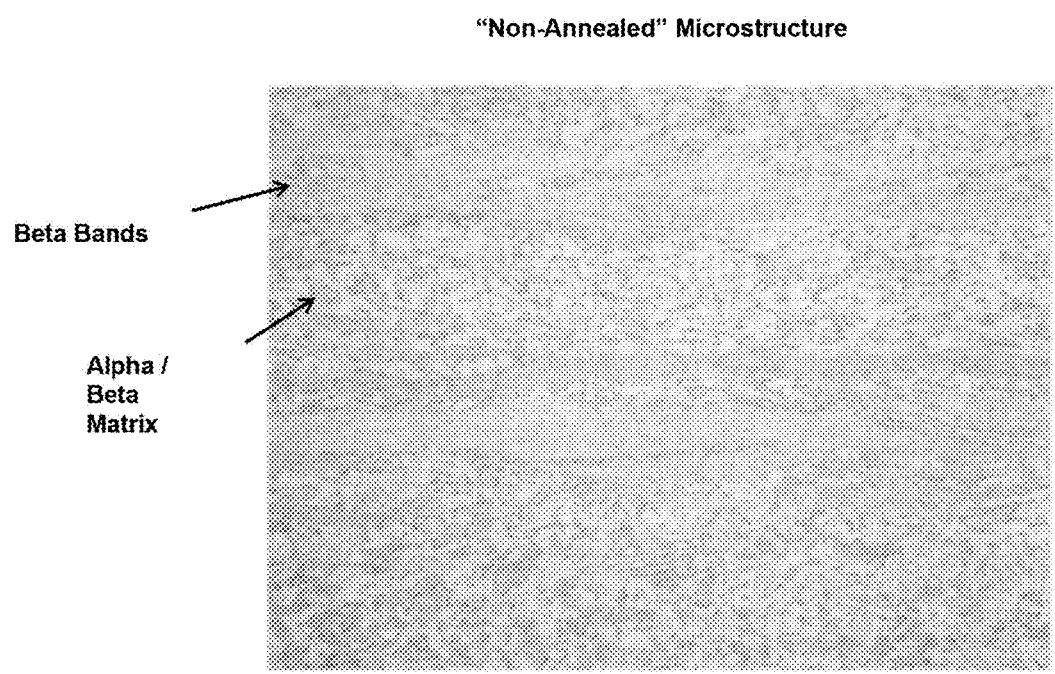
FIG. 11A is a microstructure of non-annealed T9S.
Figure 11B:
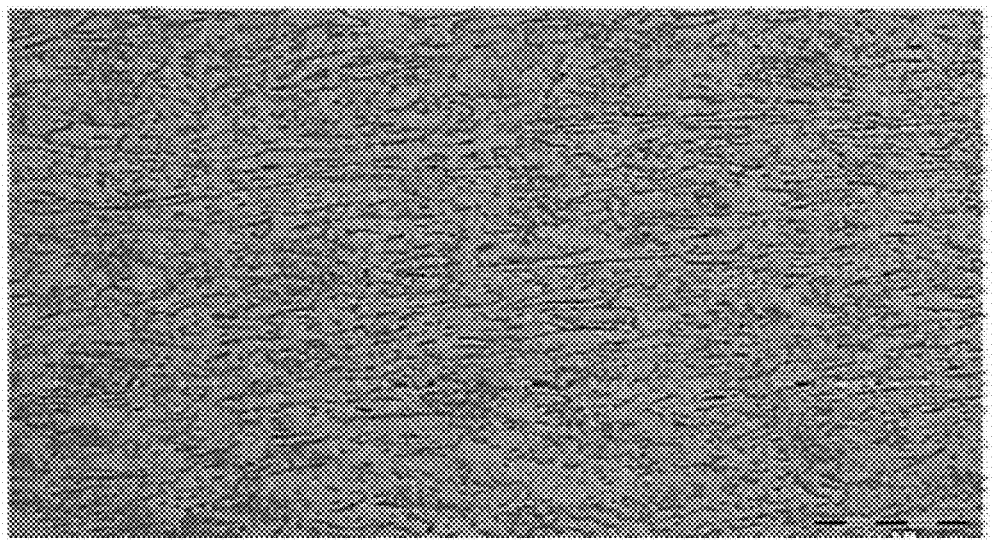
FIG. 11B is a microstructure of annealed T-9S.
Figure 11C:
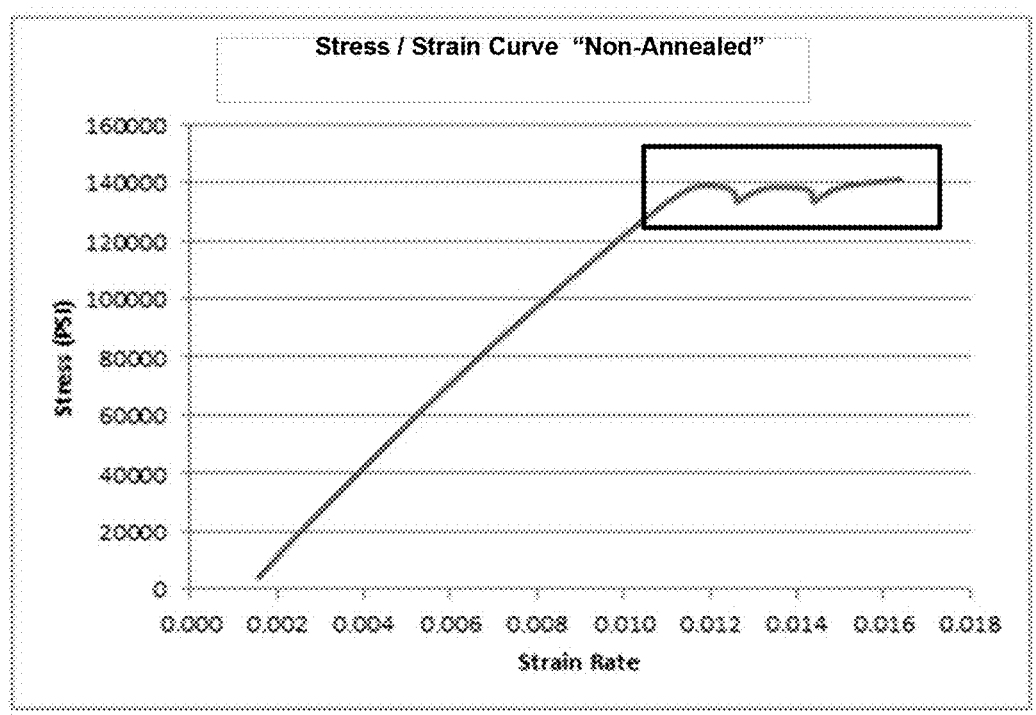
FIG. 11C is a stress/strain curve showing unstable yielding of the non-annealed T-9S alloy.
Figure 11D:
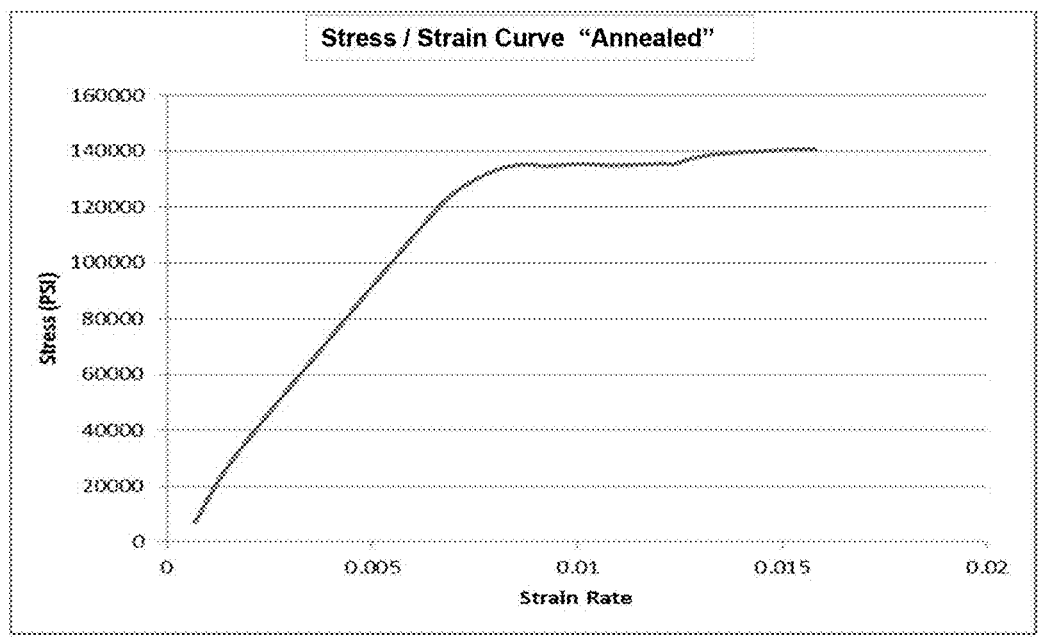
FIG. 11D is a stress/strain curve showing a more stable yielding of the annealed T-9S alloy.

FIG. 11A shows the grains in the microstructure of an α-β Ti alloy that has not been through heat treat. Distinct striations of β bands can be seen among pockets of the α/β matrix. In contrast, FIG. 11B shows the grains in the microstructure of an α-β Ti alloy that has been through heat treat. Here, the grains show directionality in the crown-to-sole direction. The corresponding stress-strain curves of the no heat treat and heat treated samples, FIGS. 12C and 12D, show the benefits of heat treat. The stress/strain curve of the non-heat treated α-β Ti alloy (FIG. 11C) shows unstable yielding at high strain rates, most likely due to deformation of β bands. The β bands are known to have a different plasticity value compared to the α/β matrix, which causes the aforementioned deformation at high strain rates. The stress/strain curve of the heat treated α-β Ti alloy (FIG. 11D) is more stable and attests to stresses transferring more easily along grain boundaries at high strain rates.

Figure 12:
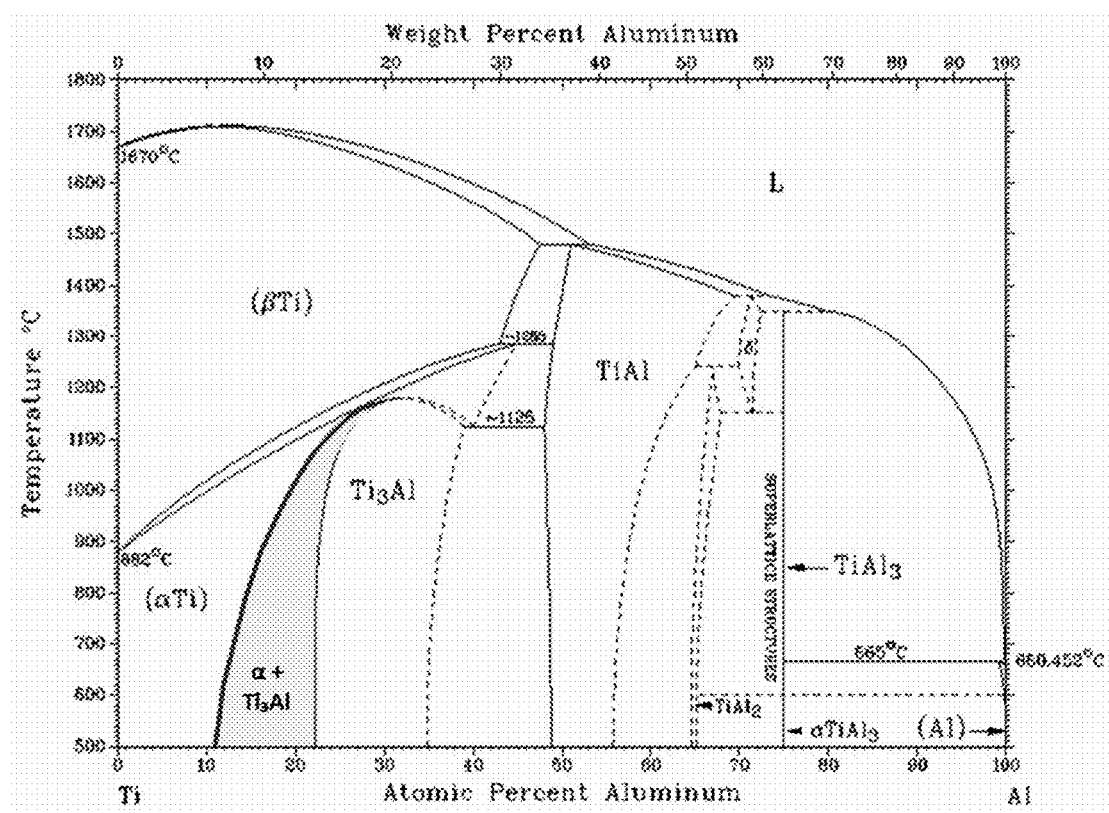
FIG. 12 is a Ti—Al phase diagram.

FIG. 12 shows the phase diagram of Ti and Al alloys. The α+Ti₃Al shaded region represents α-β Ti alloys which have not yet undergone heat treatment. α+Ti₃Al is brittle material unsuitable for faceplate manufacturing. When α+Ti₃Al is heated above its solvus temperature, indicated via the vertical line, it changes to aTi phase. During this transition, the Ti₃Al in the α+Ti₃Al goes into solution and relieves the brittle properties of α+Ti₃Al. As shown in the diagram, the temperature change for this transition depends on the percent of aluminum in the α+Ti₃Al.

Figure 14:
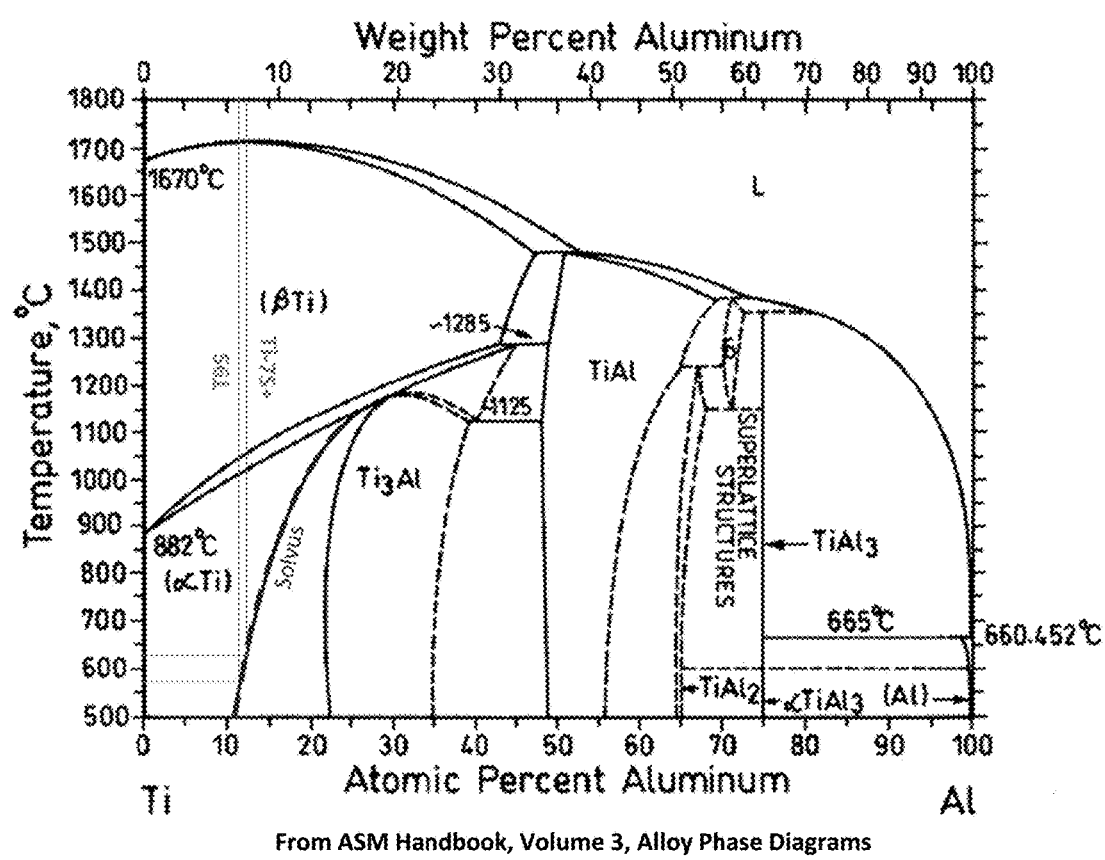
FIG. 14 is a phase diagram marked with the position of T-9S and Ti-7S$^+$ alloys.

FIG. 14 shows a phase diagram including lines representing Ti-7S+ and T9S materials. As illustrated, the solvus temperature for T9S is around 580° C. which is lower than the solvus temperature for Ti-7S+, which is around 630° C. Although the percent weight of aluminum is only slightly higher in Ti-7S+ than in T9S, the high solvus temperature of Ti-7S+ requires that it be treated at a much higher temperature (between approximately 650° C. and 700° C., or above 700° C. in some embodiments) than T9S, which can be treated between approximately 600° C. and 650° C. in some embodiments.

Figure 13:
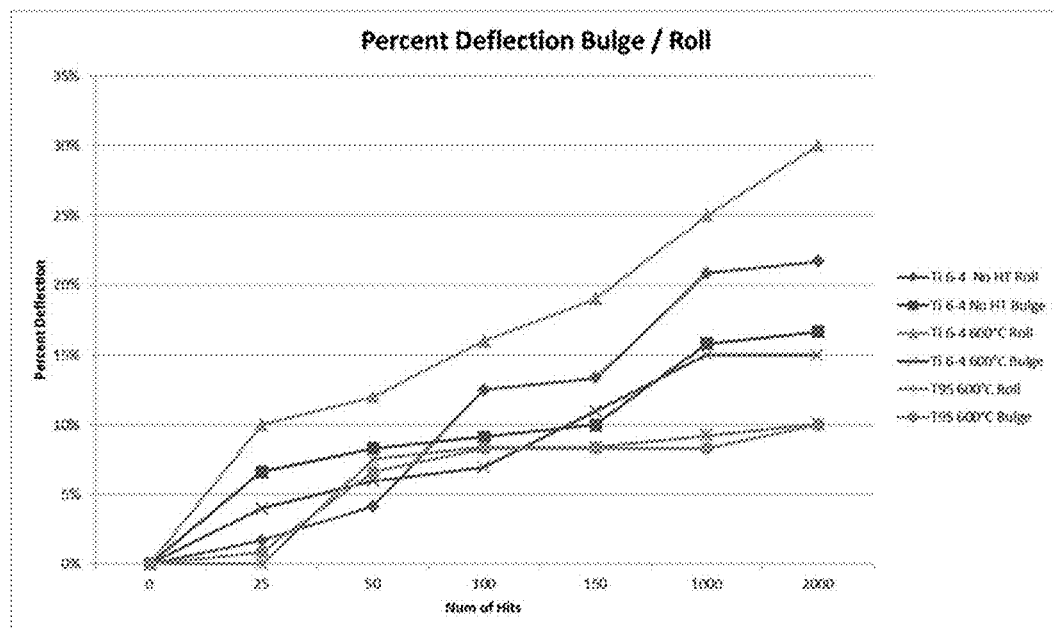
FIG. 13 is a chart showing experimental bulge and roll measurements for faceplates made of Ti 6-4 alloys with and without heat treat and T-9S alloys with heat treat.

As shown in FIG. 13, an experiment was performed to compare the amount of deflection of various faceplates 14 over the course of 0, 25, 50, 100, 150, 1000, and 2,000 hits or ball strikes. The faceplates 14 were formed from Ti 6-4 or Ti-9S (T-9S) alloy. One club head assembly made of Ti 6-4 alloy was not heat treated. A second club head assembly made of Ti6-4 alloy was heated to 600° C., which is above the solvus temperature of the Ti-9S (or T-9S) alloy. A third club head assembly made of the the Ti-9S (or T-9S) alloy was heated to 600° C., which is above the solvus temperature of the Ti-9S (or T-9S) alloy. The measurement data provided in Table 5, shown below, represent the percent change in the radius of curvature of the bulge and the roll dimensions compared to the original radius curvature.

TABLE 5

Raw data for the percentage deflection of the roll and bulge on Ti 6-4 alloys with and without heat treat and T-9S alloys with heat treat.

| Hits | Ti 6-4 No HT Roll | Ti 6-4 No HT Bulge | Ti 6-4 600° C. Roll | Ti 6-4 600° C. Bulge | T9S 600° C. Roll | T9S 600° C. Bulge |
|---|---|---|---|---|---|---|
| 0 | 0% | 0% | 0% | 0% | 0% | 0% |
| 25 | 2% | 7% | 10% | 4% | 0% | 1% |
| 50 | 4% | 8% | 12% | 6% | 8% | 7% |
| 100 | 13% | 9% | 16% | 7% | 8% | 8% |
| 150 | 13% | 10% | 19% | 11% | 8% | 8% |
| 1000 | 21% | 16% | 25% | 15% | 9% | 8% |
| 2000 | 22% | 17% | 30% | 15% | 10% | 10% |

As the faceplate becomes more flat, the radius of curvature increases. The club head assembly having a faceplate 14 made of Ti 6-4 treated at 600° C. flattened significantly in both its roll and bulge dimensions and did not perform like the club head assembly having a faceplate 14 made of T9S treated at 600° C. which stayed below 10% deflection in both its roll and bulge dimensions for all number of hits up to 2,000. This may be due to Ti 6-4 having a different or lower wt % Al content; T9S has 6.5 wt %-8.5 wt % Al and Ti 6-4 has 5.5 wt %-6.75 wt % Al. The solvus temperature for Ti 6-4 is lower at ~540-560° C. compared to the solvus temperature for T9S, which is ~560-590° C. Therefore, the 600° C. heat treat did not have the same effect on Ti 6-4 as it did on T9S. The Ti-9S faceplate treated at 600° C. maintained its' curvature better after 2000 hits than the club head assemblies having faceplates 14 of Ti-6-4 untreated and heat treated maintained curvature in both roll and bulge dimensions.

Figure 15:
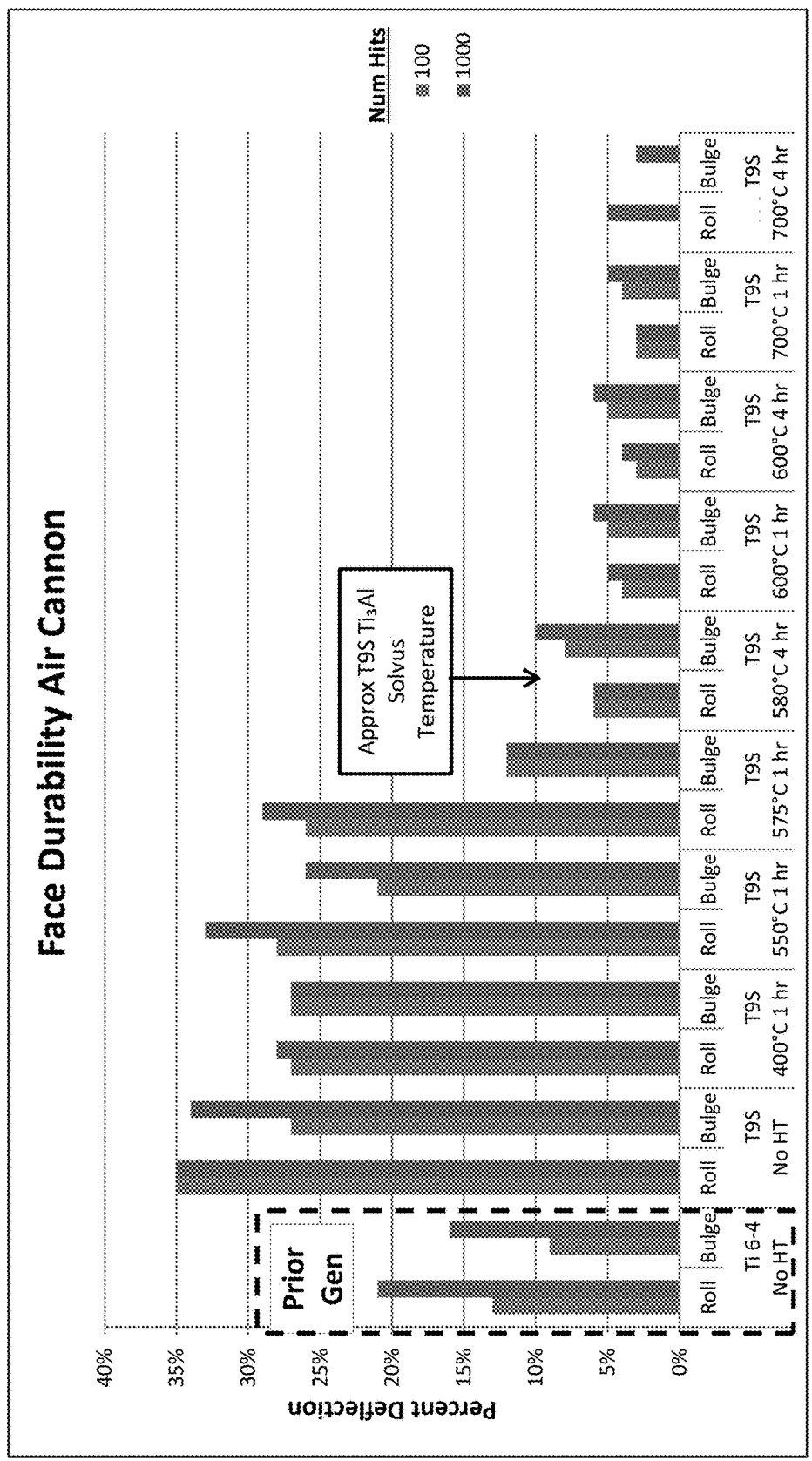
FIG. 15 is a chart showing percentage deflection of faceplates made of Ti 6-4 alloy with no heat treat and various T9S alloys having gone through differing heat treats after these faceplates have been hit 100 and 1000 times.

As shown in FIG. 15, an experiment was performed to compare the % deflection on the faceplate 14 over the course of 100 and 1000 hits or ball strikes. The faceplates 14 were formed from Ti 6-4 or Ti-9S (T-9S) alloy. The various club head assemblies were treated for either 1 or 4 hours at 400° C., 550° C., 575° C., 580° C., 600° C., and 700° C. One club head assembly made of Ti 6-4 alloy was not heat treated. A second club head assembly made of Ti-9S (or T-9S) alloy was not heat treated. A third club head assembly made of Ti-9S (or T-9S) alloy was heated for 1 hour to 400° C., which is below the solvus temperature of the Ti-9S (or T-9S) alloy. A fourth club head assembly made of Ti-9S (or T-9S) alloy was heated for 1 hour to 550° C., which is below the solvus temperature of the Ti-9S (or T-9S) alloy. A fifth club head assembly made of Ti-9S (or T-9S) alloy was heated for 1 hour to 575° C., which is below the solvus temperature of the Ti-9S (or T-9S) alloy. A sixth club head assembly made of Ti-9S (or T-9S) alloy was heated for 4 hours to 580° C., which is the solvus temperature of the Ti-9S (or T-9S) alloy. A seventh club head assembly made of Ti-9S (or T-9S) alloy was heated for 1 hour to 600° C., which is above the solvus temperature of the Ti-9S (or T-9S) alloy. A eighth club head assembly made of Ti-9S (or T-9S) alloy was heated for 4 hours to 600° C., which is above the solvus temperature of the Ti-9S (or T-9S) alloy. A ninth club head assembly made of Ti-9S (or T-9S) alloy was heated for 1 hour to 700° C., which is above the solvus temperature of the Ti-9S (or T-9S) alloy. A tenth club head assembly made of Ti-9S (or T-9S) alloy was heated for 4 hours to 700° C., which is above the solvus temperature of the Ti-9S (or T-9S) alloy. The measurement data provided in FIG. 15 represent the percent change in the radius of curvature of the bulge and the roll dimensions compared to the original radius curvature. As the faceplate becomes more flat, the radius of curvature increases. There is less deflection in roll and much more in bulge going from 575° C. to 580° C. However, at slightly higher temperature (600° C. and above), the percent deflection for both measurements drop significantly and then stays the same at even higher temperatures. This represents the inflection point where the $Ti_3Al$ particles begin to enter the solution. After reaching the 600° C. for 1 hour threshold, increasing the temperature does not give any significant improvements to geometric stability. Increasing the duration from 1 to 4 hours did not have a significant improvement on percent deflection either.

In one embodiment, the faceplate 14 that is formed from Ti-9S (or T-9S) and heat treated at the solvus temperature of Ti-9S (or T-9S), 580° C., for 4 hours, has ~9% deflection from its original bulge and ~6% deflection from its original roll curvature after about 100 strikes. In one embodiment, the faceplate 14 that is formed from Ti-9S (or T-9S) and heat treated at the solvus temperature of Ti-9S (or T-9S), 580° C., for 4 hours, has ~10% deflection from its original bulge and ~6% deflection from its original roll curvature after about 1000 strikes.

In one embodiment, the faceplate 14 that is formed from Ti-9S (or T-9S) and heat treated above the solvus temperature of Ti-9S (or T-9S), 600° C., for 1 hour, has ~5% deflection from its original bulge and ~3% deflection from its original roll curvature after about 100 strikes. In one embodiment, the faceplate 14 that is formed from Ti-9S (or T-9S) and heat treated above the solvus temperature of Ti-9S (or T-9S), 600° C., for 1 hour, has ~6% deflection from its original bulge and ~5% deflection from its original roll curvature after about 1000 strikes.

In one embodiment, the faceplate 14 that is formed from Ti-9S (or T-9S) and heat treated above the solvus temperature of Ti-9S (or T-9S), 600° C., for 4 hours, has ~5% deflection from its original bulge and ~2% deflection from its original roll curvature after about 100 strikes. In one embodiment, the faceplate 14 that is formed from Ti-9S (or T-9S) and heat treated above the solvus temperature of Ti-9S (or T-9S), 600° C., for 4 hours, has ~6% deflection from its original bulge and ~3% deflection from its original roll curvature after about 1000 strikes.

In one embodiment, the faceplate 14 that is formed from Ti-9S (or T-9S) and heat treated above the solvus temperature of Ti-9S (or T-9S), 700° C., for 1 hour, has ~4% deflection from its original bulge and ~3% deflection from its original roll curvature after about 100 strikes. In one embodiment, the faceplate 14 that is formed from Ti-9S (or T-9S) and heat treated above the solvus temperature of Ti-9S (or T-9S), 700° C., for 1 hour, has ~5% deflection from its original bulge and ~3% deflection from its original roll curvature after about 1000 strikes.

In one embodiment, the faceplate 14 that is formed from Ti-9S (or T-9S) and heat treated above the solvus temperature of Ti-9S (or T-9S), 700° C., for 4 hours, has ~3% deflection from its original bulge and ~5% deflection from its original roll curvature after about 100 strikes.

Figure 18:
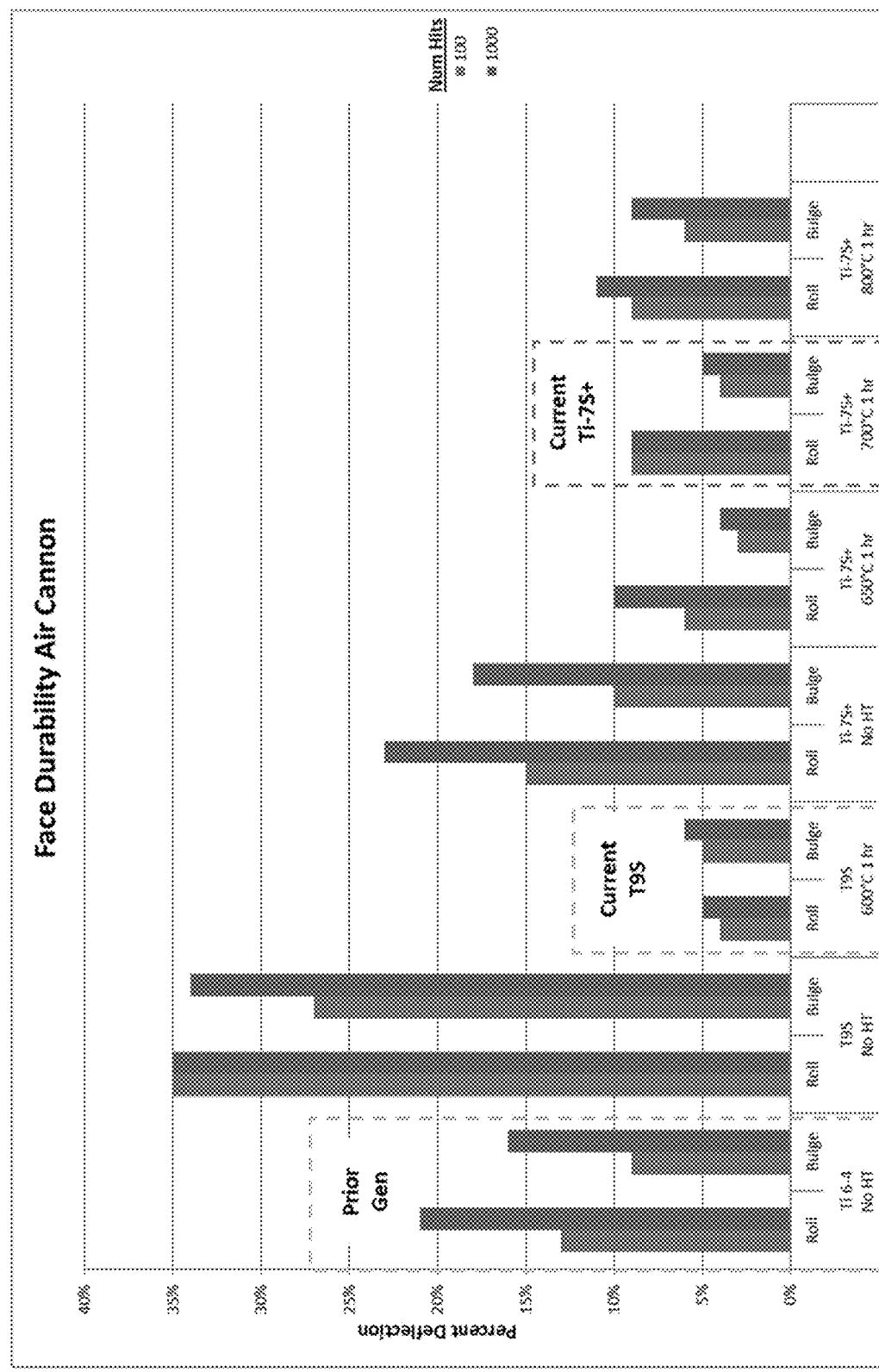
FIG. 18 is a chart showing percentage deflection of faceplates made of Ti 6-4 alloy with no heat treat, and various T9S and Ti-7S$^+$ alloys having gone through differing heat treats after these faceplates have been hit 100 and 1000 times.

As shown in FIG. 18, an experiment was performed to compare the % deflection on the faceplate 14 over the course of 100 and 1000 hits or ball strikes. The faceplates 14 were formed from Ti 6-4, Ti-9S (T-9S), or Ti-7S$^+$ alloy. The various club head assemblies were either not heat treated or were treated for 1 hour at 600° C., 650° C., 700° C., or 800° C. One club head assembly made of Ti 6-4 alloy was not heat treated. A second club head assembly made of Ti-9S (or T-9S) alloy was not heat treated. A third club head assembly made of Ti-9S (or T-9S) alloy was heated for 1 hour to 600° C., which is above the solvus temperature of the Ti-9S (or T-9S) alloy. A fourth club head assembly made of Ti-7S$^+$ alloy was not heat treated. A fifth club head assembly made of Ti-7S$^+$ alloy was heated for 1 hour to 650° C., which is above the solvus temperature of the Ti-7S$^+$ alloy. A sixth club head assembly made of Ti-7S$^+$ alloy was heated for 1 hour to 700° C., which is above the solvus temperature of the Ti-7S$^+$ alloy. A seventh club head assembly made of Ti-7S$^+$ alloy was heated for 1 hour to 800° C., which is above the solvus temperature of the Ti-7S$^+$ alloy. The measurement data provided in FIG. 18 represents the percent change in the radius of curvature of the bulge and the roll dimensions compared to the original radius curvature. As the faceplate becomes more flat, the radius of curvature increases. The assemblies that were heat treated above the solvus temperature of the alloy show significantly lower deflection over 100 and 1000 hits. As shown through the Ti-7S$^+$ data for not treated, treated at 650° C., 700° C., and 800° C., increasing the treatment temperature after the solvus temperature is already attained offers no improvement in percent deflection. At the solvus temperature, which acts as an inflection point, the $Ti_3Al$ particles begin to enter the solution. After reaching the inflection point threshold, increasing the temperature does not give any significant improvements to geometric stability. Furthermore, FIG. 18 demonstrates that increasing the number of hits tenfold does not change the results significantly for the heat treated alloys. The majority of the deflection for these heat treated faceplates happens during the first 100 hits, after which the deflection changes less than 5%.

In one embodiment, the faceplate 14 that is formed from Ti-9S (or T-9S) and heat treated at 600° C., above the solvus temperature of Ti-9S (or T-9S), has ~5% deflection from its original bulge and ~4% deflection from its original roll curvature after about 100 strikes. In one embodiment, the faceplate 14 that is formed from Ti-9S (or T-9S) and heat treated at 600° C., above the solvus temperature of Ti-9S (or T-9S), has ~6% deflection from its original bulge and ~5% deflection from its original roll curvature after about 1000 strikes.

In one embodiment, the faceplate 14 that is formed from Ti-7S⁺ and heat treated at 650° C., above the solvus temperature of Ti-7S⁺, has ~3% deflection from its original bulge and ~6% deflection from its original roll curvature after about 100 strikes. In one embodiment, the faceplate 14 that is formed from Ti-7S⁺ and heat treated at 650° C., above the solvus temperature of Ti-7S⁺, has ~4% deflection from its original bulge and ~10% deflection from its original roll curvature after about 1000 strikes.

In one embodiment, the faceplate 14 that is formed from Ti-7S⁺ and heat treated at 700° C., above the solvus temperature of Ti-7S⁺, has ~4% deflection from its original bulge and ~9% deflection from its original roll curvature after about 100 strikes. In one embodiment, the faceplate 14 that is formed from Ti-7S⁺ and heat treated at 700° C., above the solvus temperature of Ti-7S⁺, has ~5% deflection from its original bulge and ~9% deflection from its original roll curvature after about 1000 strikes.

In one embodiment, the faceplate 14 that is formed from Ti-7S⁺ and heat treated at 800° C., above the solvus temperature of Ti-7S⁺, has ~6% deflection from its original bulge and ~9% deflection from its original roll curvature after about 100 strikes. In one embodiment, the faceplate 14 that is formed from Ti-7S⁺ and heat treated at 800° C., above the solvus temperature of Ti-7S⁺, has ~9% deflection from its original bulge and ~11% deflection from its original roll curvature after about 1000 strikes.

In one embodiment, the faceplate 14 that is formed from an $\alpha$-$\beta$ Ti alloy and heat treated above its solvus temperature, 500-1200° C., has 30% or less deflection from its original bulge and 30% or less deflection from its original roll curvature after about 2000 strikes or less.

In one embodiment, the faceplate 14 that is formed from an $\alpha$-$\beta$ Ti alloy and heat treated at or above its solvus temperature has 30% or less deflection from its original bulge and 30% or less deflection from its original roll curvature after about 2000 strikes or less. In one embodiment, the faceplate 14 that is formed from an $\alpha$-$\beta$ Ti alloy and heat treated at or above its solvus temperature has 25% or less deflection from its original bulge and 25% or less deflection from its original roll curvature after about 2000 strikes or less. In one embodiment, the faceplate 14 that is formed from an $\alpha$-$\beta$ Ti alloy and heat treated at or above its solvus temperature has 20% or less deflection from its original bulge and 20% or less deflection from its original roll curvature after about 2000 strikes or less. In one embodiment, the faceplate 14 that is formed from an $\alpha$-$\beta$ Ti alloy and heat treated at or above its solvus temperature has 15% or less deflection from its original bulge and 15% or less deflection from its original roll curvature after about 2000 strikes or less. In one embodiment, the faceplate 14 that is formed from an $\alpha$-$\beta$ Ti alloy and heat treated at or above its solvus temperature has 10% or less deflection from its original bulge and 10% or less deflection from its original roll curvature after about 2000 strikes or less. In one embodiment, the faceplate 14 that is formed from an $\alpha$-$\beta$ Ti alloy and heat treated at or above its solvus temperature has 9% or less deflection from its original bulge and 9% or less deflection from its original roll curvature after about 2000 strikes or less. In one embodiment, the faceplate 14 that is formed from an $\alpha$-$\beta$ Ti alloy and heat treated at or above its solvus temperature has 8% or less deflection from its original bulge and 8% or less deflection from its original roll curvature after about 2000 strikes or less. In one embodiment, the faceplate 14 that is formed from an $\alpha$-$\beta$ Ti alloy and heat treated at or above its solvus temperature has 7% or less deflection from its original bulge and 7% or less deflection from its original roll curvature after about 2000 strikes or less. In one embodiment, the faceplate 14 that is formed from an $\alpha$-$\beta$ Ti alloy and heat treated at or above its solvus temperature has 6% or less deflection from its original bulge and 6% or less deflection from its original roll curvature after about 2000 strikes or less. In one embodiment, the faceplate 14 that is formed from an $\alpha$-$\beta$ Ti alloy and heat treated at or above its solvus temperature has 5% or less deflection from its original bulge and 5% or less deflection from its original roll curvature after about 2000 strikes or less. In one embodiment, the faceplate 14 that is formed from an $\alpha$-$\beta$ Ti alloy and heat treated at or above its solvus temperature has 4% or less deflection from its original bulge and 4% or less deflection from its original roll curvature after about 2000 strikes or less. In one embodiment, the faceplate 14 that is formed from an $\alpha$-$\beta$ Ti alloy and heat treated at or above its solvus temperature has 3% or less deflection from its original bulge and 3% or less deflection from its original roll curvature after about 2000 strikes or less. In one embodiment, the faceplate 14 that is formed from an $\alpha$-$\beta$ Ti alloy and heat treated at or above its solvus temperature has 2% or less deflection from its original bulge and 2% or less deflection from its original roll curvature after about 2000 strikes or less. In one embodiment, the faceplate 14 that is formed from an $\alpha$-$\beta$ Ti alloy and heat treated at or above its solvus temperature has 1% or less deflection from its original bulge and 1% or less deflection from its original roll curvature after about 2000 strikes or less. In one embodiment, the faceplate 14 that is formed from an $\alpha$-$\beta$ Ti alloy and heat treated at or above its solvus temperature has 0% or less deflection from its original bulge and 0% or less deflection from its original roll curvature after about 2000 strikes or less.

Thus, the invention provides, among other things, a method of forming a golf club head assembly. Although the invention has been described in detail with reference to certain preferred embodiments, variations and modifications exist within the scope and spirit of one or more independent aspects of the invention as described.

Clause 1. A method of forming a golf club head assembly, the method comprising: (a) providing a faceplate formed from an $\alpha$-$\beta$ titanium alloy, the $\alpha$-$\beta$ titanium alloy comprising between 7 wt % to 20 wt % aluminum (Al), 2-3 wt % molybdenum (Mo), and 0.5-1.5 wt % vanadium (Vn); (b) aligning the faceplate with a recess of a club head; (c) welding the faceplate to the club head; (d) heating the club head and the faceplate to a temperature that is greater than the solvus temperature of the faceplate for a predetermined amount of time; and allowing the club head and the faceplate to cool in an inert gas, wherein step (d) is performed between 720° C. and 1200° C. for between 1 hour and 6 hours.

Clause 2. A method of forming a golf club head assembly, the method comprising: The method of clause 1, wherein the $\alpha$-$\beta$ titanium alloy comprises between 0.5 wt % to 1.5 wt % iron (Fe).

Clause 3. A method of forming a golf club head assembly, the method comprising: The method of clause 1, wherein the $\alpha$-$\beta$ titanium alloy comprises between 7 wt % to 13 wt % aluminum (Al).

31

Clause 4. A method of forming a golf club head assembly, the method comprising: The method of clause 1, wherein the α-β titanium alloy comprises between 8.5 wt % to 13 wt % aluminum (Al).

Clause 5. A method of forming a golf club head assembly, the method comprising: The method of clause 1, wherein the α-β titanium alloy comprises between 7 wt % to 8 wt % aluminum (Al).

Clause 6. The method of clause 1, wherein the α-β titanium alloy further comprises less than 0.25 wt % silicon, less than 0.20 wt % oxygen, less than 0.05 wt % carbon, and less than 0.04 wt % nitrogen and the remaining weight percent is titanium (Ti).

Clause 7. The method of clause 1, wherein the welding of step (c) includes a pulse plasma welding process.

Clause 8. The method of clause 1, wherein the inert gas of step (e) is selected from the group consisting of nitrogen (N), argon (Ar), helium (He), neon (Ne), krypton (Kr), and xenon (Xe) or a compound gas thereof.

Clause 9. The method of clause 4, wherein the inert gas is nitrogen (N) or argon (Ar).

Clause 10. The method of clause 1, wherein the faceplate of step (a) has a minimum thickness of 0.7 mm.

Clause 11. The method of clause 1, wherein step (d) includes heating the club head and the faceplate between 550° C. and 1200° C. for between 1 hour and 2 hours.

Clause 12. The method of clause 10, wherein heating the club head and the faceplate includes heating the club head and the faceplate to between 575° C. and 1200° C. for between 1 hour and 2 hours.

Clause 13. The method of clause 10, wherein heating the club head and the faceplate includes heating the club head and the faceplate to between 620° C. and 1150° C. for between 1 hour and 2 hours.

Clause 14. A method of forming a golf club head assembly, the method comprising: providing a faceplate formed from an α-β titanium alloy, the α-β titanium alloy comprising between 6.5 wt % to 20 wt % aluminum (Al), 2-3 wt % molybdenum, approximately 0.5-1.5 wt % iron, and approximately 0.5-1.5 wt % vanadium, less than 0.25 wt % silicon, less than 0.20 wt % oxygen, less than 0.05 wt % carbon, and less than 0.04 wt % nitrogen and the remaining weight percent is titanium (Ti);
aligning the faceplate with a recess of a club head;
welding the faceplate to the club head;
after welding the faceplate, heating the club head and the faceplate to a temperature that is greater than the solvus temperature of the faceplate for a predetermined amount of time; and
after heating the club head and the faceplate, allowing the club head and the faceplate to cool in an inert gas environment.

Clause 14. The method of clause 13, wherein welding the faceplate includes a pulse plasma welding process.

Clause 15. The method of clause 13, wherein heating the club head and the faceplate includes heating the club head and the faceplate for between 1 hour and 6 hours.

Clause 16. The method of clause 15, wherein heating the club head and the faceplate includes heating the club head and the faceplate to between 520° C. and 1200° C.

Clause 17. The method of clause 15, wherein heating the club head and the faceplate includes heating the club head and the faceplate to between 720° C. and 1000° C.

Clause 18. The method of clause 15, wherein heating the club head and the faceplate includes heating the club head and the faceplate to between 520° C. and 1200° C. for between 1 hour and 2 hours.

32

Clause 19. The method of clause 15, wherein heating the club head and the faceplate includes heating the club head and the faceplate to between 720° C. and 1000° C. for between 1 hour and 2 hours.

Clause 20. The method of claim 15, wherein heating the club head and the faceplate includes heating the club head and the faceplate to between 720° C. and 900° C. for between 1 hour and 2 hours.

The invention claimed is:

1. A method of forming a golf club head assembly, the method comprising:
   (a) providing a faceplate formed from an α-β titanium alloy, the α-β titanium alloy comprising between 7 wt % to 20 wt % aluminum (Al), 2-3 wt % molybdenum (Mo), and 0.5-1.5 wt % vanadium (Vn);
   (b) aligning the faceplate with a recess of a club head;
   (c) welding the faceplate to the club head;
   (d) heating the club head and the faceplate to a temperature that is greater than the solvus temperature of the faceplate for a predetermined amount of time; and
   (e) allowing the club head and the faceplate to cool in an inert gas, wherein step (d) is performed between 720° C. and 1200° C. for between 1 hour and 6 hours.

2. The method of claim 1, wherein the α-β titanium alloy comprises between 0.5 wt % to 1.5 wt % iron (Fe).

3. The method of claim 1, wherein the α-β titanium alloy comprises between 7 wt % to 13 wt % aluminum (Al).

4. The method of claim 1, wherein the α-β titanium alloy comprises between 8.5 wt % to 13 wt % aluminum (Al).

5. The method of claim 4, wherein the inert gas is nitrogen (N) or argon (Ar).

6. The method of claim 1, wherein the α-β titanium alloy comprises between 7 wt % to 8 wt % aluminum (Al).

7. The method of claim 1, wherein the α-β titanium alloy further comprises less than 0.25 wt % silicon, less than 0.20 wt % oxygen, less than 0.05 wt % carbon, and less than 0.04 wt % nitrogen and the remaining weight percent is titanium (Ti).

8. The method of claim 1, wherein the welding of step (c) includes a pulse plasma welding process.

9. The method of claim 1, wherein the inert gas of step (e) is selected from the group consisting of nitrogen (N), argon (Ar), helium (He), neon (Ne), krypton (Kr), and xenon (Xe) or a compound gas thereof.

10. The method of claim 1, wherein the faceplate of step (a) has a minimum thickness of 0.7 mm.

11. The method of claim 1, wherein step (d) includes heating the club head and the faceplate between 550° C. and 1200° C. for between 1 hour and 2 hours.

12. The method of claim 11, wherein heating the club head and the faceplate includes heating the club head and the faceplate to between 575° C. and 1200° C. for between 1 hour and 2 hours.

13. The method of claim 11, wherein heating the club head and the faceplate includes heating the club head and the faceplate to between 620° C. and 1150° C. for between 1 hour and 2 hours.

14. A method of forming a golf club head assembly, the method comprising: providing a faceplate formed from an α-β titanium alloy, the α-β titanium alloy comprising between 6.5 wt % to 20 wt % aluminum (Al), 2-3 wt % molybdenum, approximately 0.5-1.5 wt % iron, and approximately 0.5-1.5 wt % vanadium, less than 0.25 wt % silicon, less than 0.20 wt % oxygen, less than 0.05 wt % carbon, and less than 0.04 wt % nitrogen and the remaining weight percent is titanium (Ti);
aligning the faceplate with a recess of a club head;
welding the faceplate to the club head;

after welding the faceplate, heating the club head and the faceplate to a temperature that is greater than the solvus temperature of the faceplate for a predetermined amount of time; and after heating the club head and the faceplate, allowing the club head and the faceplate to cool in an inert gas environment.

15. The method of claim 14, wherein welding the faceplate includes a pulse plasma welding process.

16. The method of claim 14, wherein heating the club head and the faceplate includes heating the club head and the faceplate for between 1 hour and 6 hours.

17. The method of claim 16, wherein heating the club head and the faceplate includes heating the club head and the faceplate to between 520° C. and 1200° C.

18. The method of claim 16, wherein heating the club head and the faceplate includes heating the club head and the faceplate to between 720° C. and 1000° C.

19. The method of claim 16, wherein heating the club head and the faceplate includes heating the club head and the faceplate to between 520° C. and 1200° C. for between 1 hour and 2 hours.

20. The method of claim 16, wherein heating the club head and the faceplate includes heating the club head and the faceplate to between 720° C. and 900° C. for between 1 hour and 2 hours.

* * * * *